United States Patent
Coward

(10) Patent No.: US 6,363,420 B1
(45) Date of Patent: Mar. 26, 2002

(54) METHOD AND SYSTEM FOR HEURISTICALLY DESIGNING AND MANAGING A NETWORK

(75) Inventor: Leslie Andrew Coward, Garland, TX (US)

(73) Assignee: Mortel Networks Limited, St. Laurent (CA)

(*) Notice: Subject to any disclaimer, the term of this patent is extended or adjusted under 35 U.S.C. 154(b) by 0 days.

(21) Appl. No.: 09/092,411

(22) Filed: Jun. 4, 1998

(51) Int. Cl.⁷ ........................................... G06F 15/177
(52) U.S. Cl. ........................................ 709/221; 709/220
(58) Field of Search ........................... 709/220, 223, 709/224, 221, 226, 239, 246

(56) References Cited

U.S. PATENT DOCUMENTS

| | | | | |
|---|---|---|---|---|
| 5,317,677 A | * | 5/1994 | Dolan et al. | |
| 5,634,009 A | * | 5/1997 | Iddon et al. | 709/223 |
| 5,862,348 A | * | 1/1999 | Pedersen | 709/239 |
| 5,974,237 A | * | 10/1999 | Shurmer et al. | 709/224 |
| 6,003,075 A | * | 12/1999 | Arendt et al. | 709/221 |
| 6,003,079 A | * | 12/1999 | Friedrich et al. | 709/224 |
| 6,038,677 A | * | 3/2000 | Lawlor et al. | 709/226 |
| 6,061,740 A | * | 5/2000 | Ferguson et al. | 709/246 |
| 6,070,191 A | * | 5/2000 | Nerendran et al. | 709/226 |

\* cited by examiner

Primary Examiner—Mark H. Rinehart
Assistant Examiner—Marc D. Thompson
(74) Attorney, Agent, or Firm—Carr & Storm, L.L.P.

(57) ABSTRACT

A method for performing combinations of functions which can heuristically modify the functional components of the machine, separate such functional components down to the device level, and optimize the distribution of information between the functional components, by defining the domains for the network, acquiring data for each domain at each of a plurality of points in time, creating repetition clusters by looking for combinations of data that recur, identifying action to be performed based on the repetition clusters; and acquiring data from the consequences of actions performed.

25 Claims, 21 Drawing Sheets

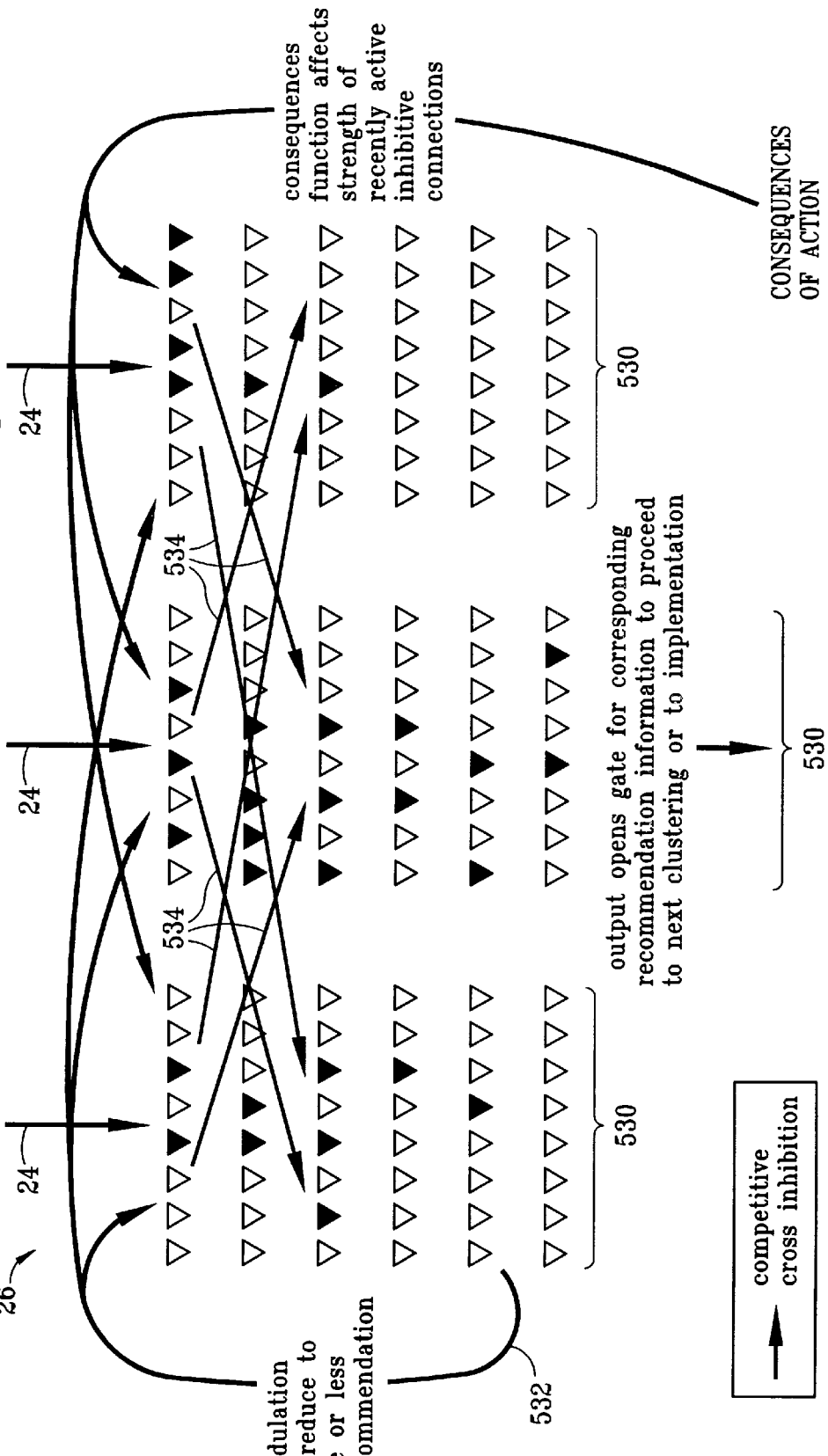

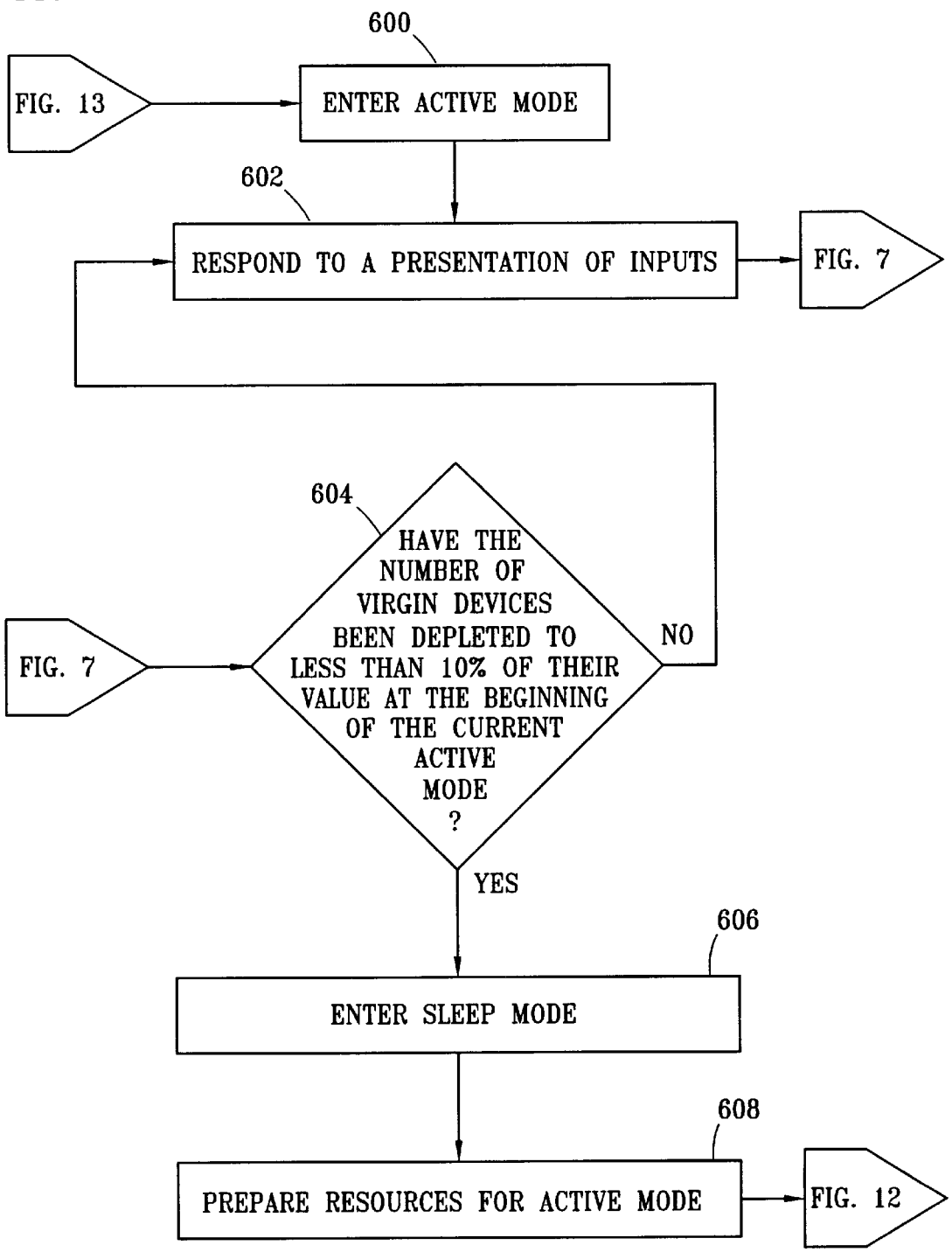

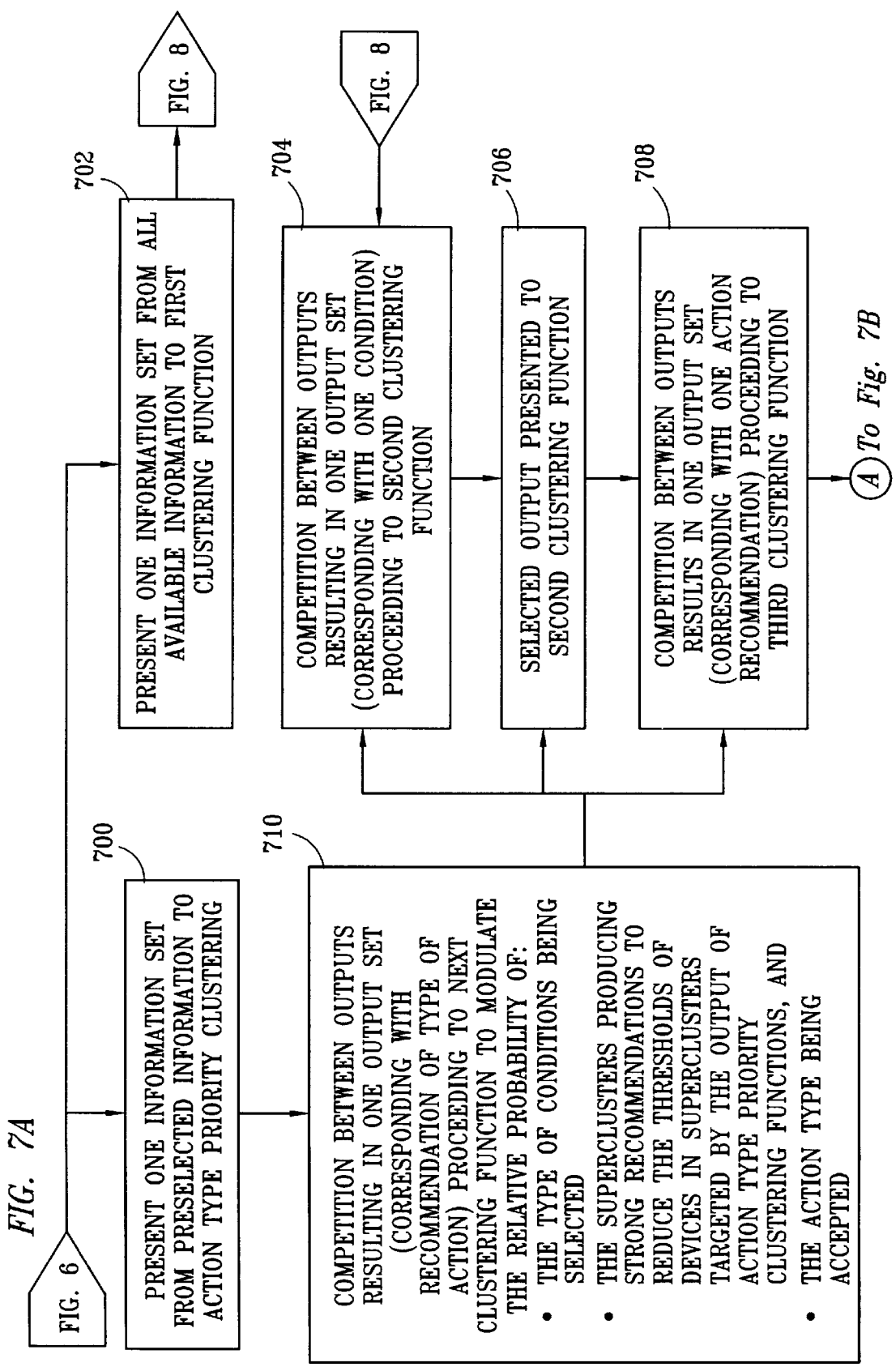

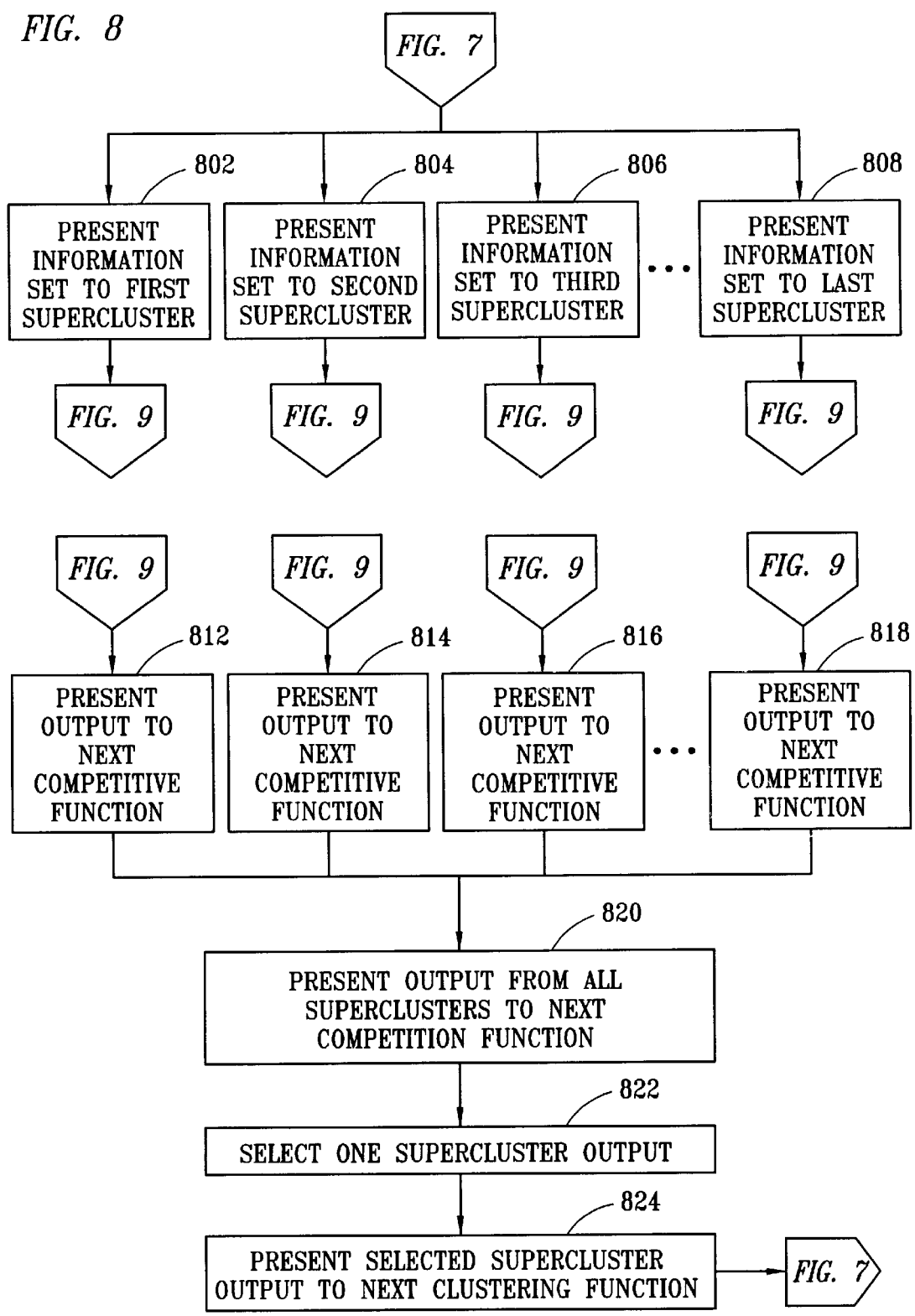

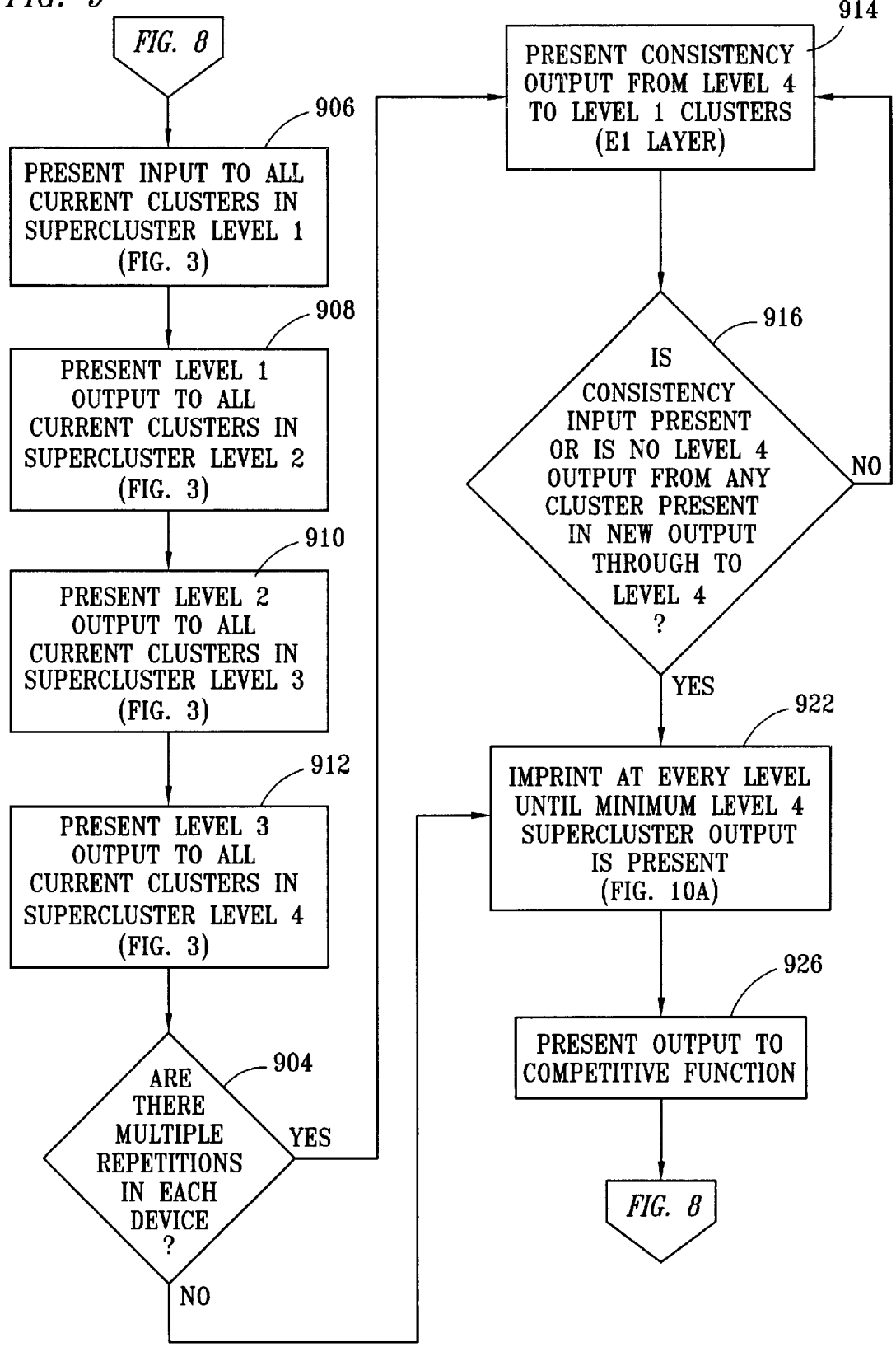

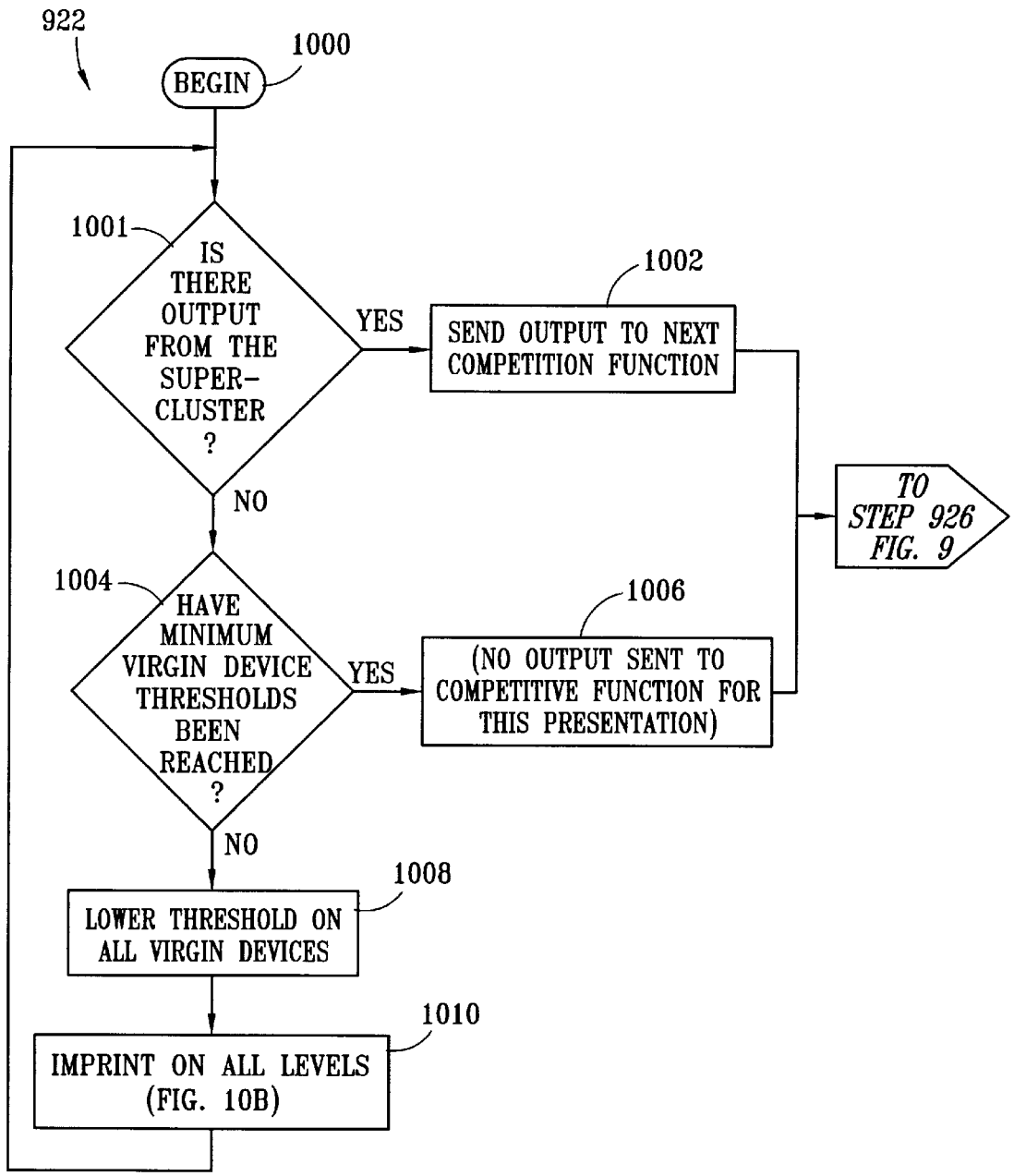

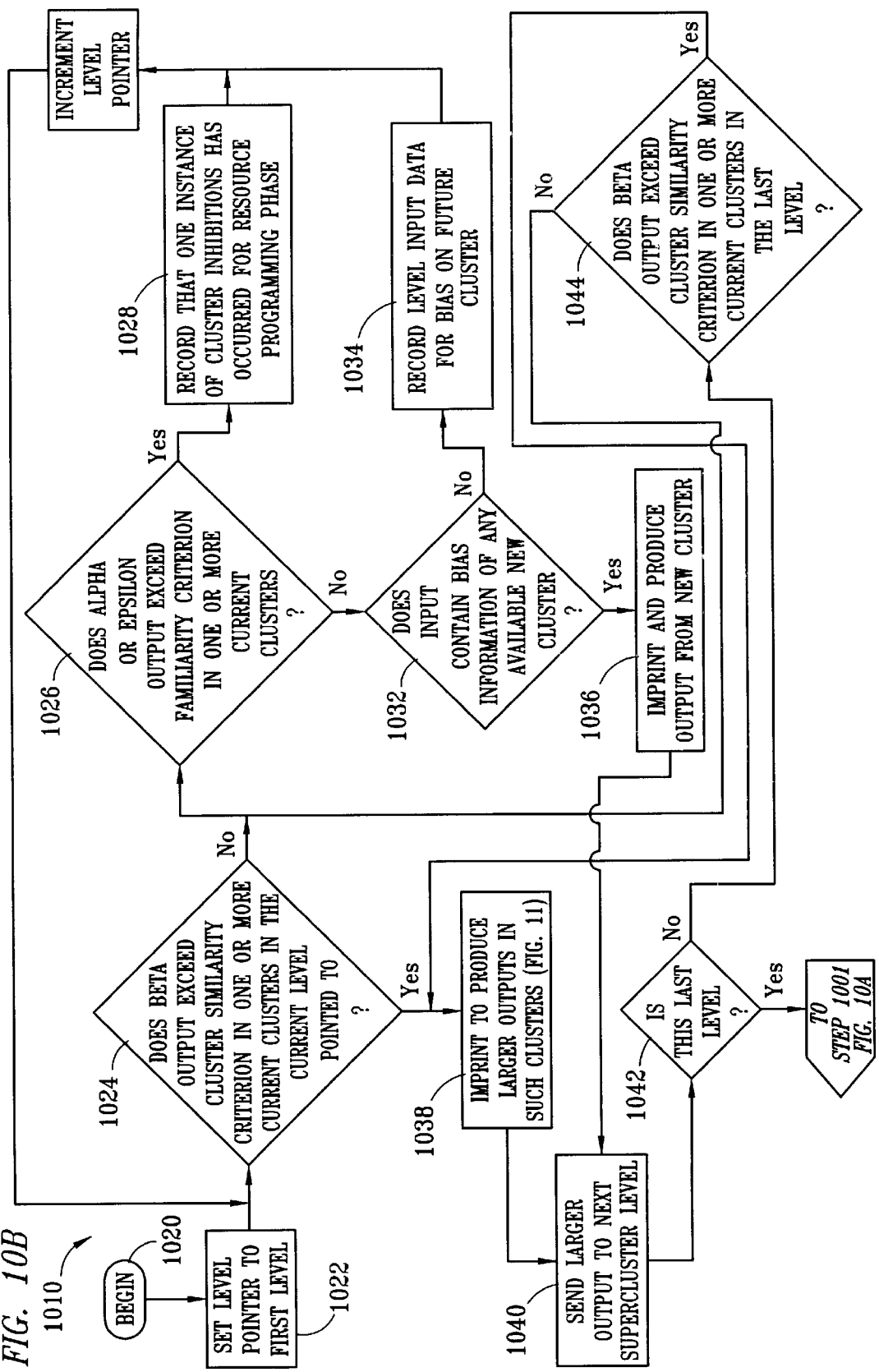

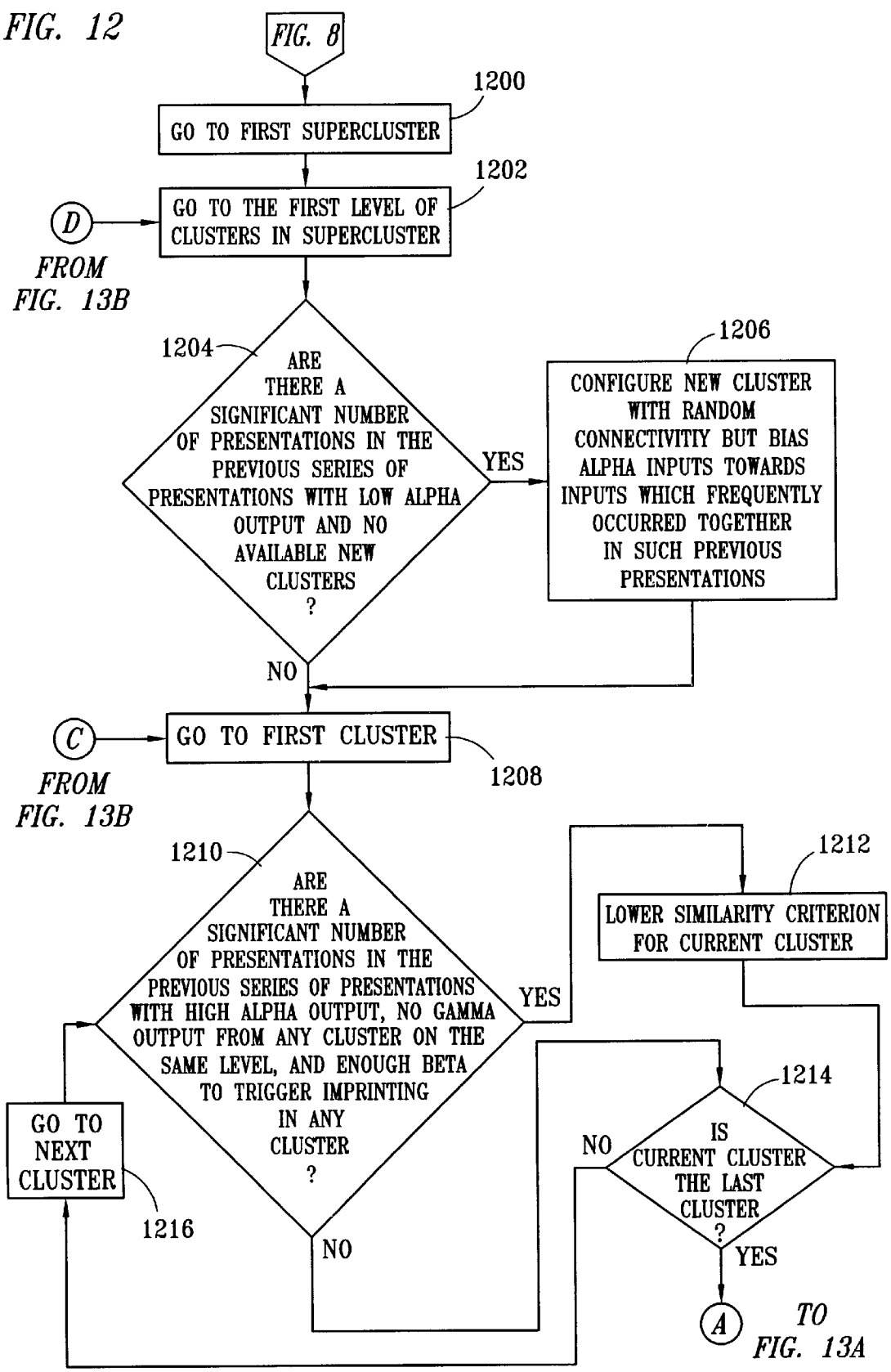

FIG. 14

| Presentation | Inputs Activated During Presentation | | | | | | | | | | | | | | | | | | | | Inputs Connected/Imprinted | | | | | | Comments |
|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 2 | 7 | 12 | 14 | 18 | 19 | |
| 1 | | • | | • | | • | | | | | | | | | | | | | | | | | | | | | 2 common inputs so no imprinting, remains virgin node |
| 2 | • | | | • | • | | | | | | | | | | | | | | • | | | | | | | | 1 common input so no imprinting, remains virgin node |
| 3 | | • | • | | • | | | | | | | • | | • | | | | | | | • | | • | • | | | 3 common inputs are imprinted, no longer virgin |
| 4 | • | | • | • | | | | | | | | | | | | | | | | | • | | • | • | | | no fire |
| 5 | | | • | | | | • | • | | | | • | | | • | | • | • | • | | • | | • | • | | | 3 common inputs but not the imprinted inputs, no fire or imprinting |
| 6 | | • | | • | | | • | | | | | • | | • | | | | | | | • | | • | • | | | 3 common inputs same as imprinted, so node fires |
| 7 | • | | | | • | | | | • | | | | | | • | | | | | • | • | | • | • | | | no fire |
| 8 | | • | • | | | | | | | | | • | | • | • | | • | | | • | • | | • | • | | • | 3 same as imprinted inputs plus 4th common, so imprint 4th and fire |
| 9 | | • | | | | | • | | | | | • | | • | | | | • | | | • | | • | • | • | • | 3 common inputs so node fires |
| 10 | • | • | | | | • | • | | | | | • | | • | | • | | | | | • | | • | • | | • | no fire |

FIG. 15

| Presentation | \multicolumn{20}{c}{Inputs Activated During Presentation} | Comments |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | |
| Provisional inputs to one virgin device | • | | | | | | | | | | | | | | | | | | | | |
| Presentation 1 Strong beta Strong gamma | | | • | | | • | | | | | • | • | | | • | | • | | • | | 7 active inputs No response (no response no matter how many inputs) |
| Presentation 2 Weak or no beta Strong or weak gamma | | • | • | • | • | • | | | | | | | | | • | | • | • | | | 5 active inputs No response (no response no matter how many inputs) |
| Presentation 3 Strong beta Weak gamma | | | • | | | • | | | • | | | • | | • | | | | • | • | • | 4 active inputs; Inputs 11, 15, 17, 19 deleted, Inputs 3, 6, 12, 20 imprinted. Parameter threshold set at <4 (e.g., 3). Device is no longer virgin device |
| Presentation 4 Any beta Any gamma | | | | | | | | • | | | • | | | | | • | | • | • | | No imprinted inputs activated. No response |
| Presentation 5 Any beta Any gamma | | | • | | | • | | | | | | • | • | • | | | | | | | 3 imprinted inputs activated so output IS produced |
| Presentation 6 Any beta Any gamma | | • | | | | • | | | | | | | | | | • | | • | | | 2 imprinted inputs activated so NO output is produced |

METHOD AND SYSTEM FOR HEURISTICALLY DESIGNING AND MANAGING A NETWORK

COMPACT-DISC APPENDIX

Two Compact Disc-Recordables (CD-Rs, Copy 1 and Copy 2), containing a computer program listing, constitute a part of the specification of this invention pursuant to 37 C.F.R. 1.77 and 1.96, and is incorporated by reference herein for all purposes. Each CD-R includes an identical single file named APPEND.TXT.;1 which conforms to the ISO 9660 standard, was created on the CD-R on Jul. 9, 2001, and contains 338 kilobytes on the CD-R (actual size of the file is 345,469 bytes).

FIELD OF THE INVENTION

The invention relates generally to a method and system for managing complex telecommunications networks and, more particularly, to performing extremely complex combinations of functions in which the functions can be modified by the system in response to experience.

BACKGROUND OF THE INVENTION

There are severe constraints on the architecture of systems which perform complex combinations of functionality using large numbers of devices. These constraints derive from the need to construct, repair and modify the system. Such needs require a means to relate functionality at a high level to the functionality of individual devices and groups of devices. Such systems are therefore constrained to adopt a simple functional architecture. In a functional architecture, functionality is partitioned into components and the components into subcomponents through a number of levels down to the device level. In a simple functional architecture, the components on one level perform roughly equal proportions of functionality, and the necessary information exchange between components is minimized.

The predominant functional architecture is the instruction architecture in which the information exchanged between functional components is unambiguous to the receiving component. Use of unambiguous information results in the memory/processing separations observed in commercial electronic systems. The von Neumann architecture is a special case of the instruction architecture in which functionality is coded as unambiguous information. A drawback with the instruction architecture, and with the von Neumann architecture in particular, is that functionality must be performed sequentially and, furthermore, it is difficult to construct systems which heuristically modify their own functionality.

Neural networks have attempted to overcome the drawbacks of the instruction architecture, but they make the use of unambiguous information from instruction architecture design approaches. As a result, neural networks cannot scale up from the device level to a higher level of heuristically modified, complex functionality.

Therefore, what is needed is an architecture which can scale up to complex functionality, and which is not difficult to construct, repair, and modify.

SUMMARY OF THE INVENTION

The invention includes a method and system for performing combinations of functions which can heuristically modify the functional components of the machine, separate such functional components down to the device level, and optimize the distribution of information between the functional components, by defining the domains for the network, acquiring data for each domain at each of a plurality of points in time, creating repetition clusters by looking for combinations of data that recur, identifying action to be performed based on the repetition clusters; and acquiring data from the consequences of actions performed.

BRIEF DESCRIPTION OF THE DRAWINGS

The following Detailed Description makes reference to FIGS. 1 through 13, which are briefly described as follows:

FIGS. 5 and 5A is a schematic diagram showing the architecture of a device shown in FIG. 4;

FIG. 6 is a flow chart illustrating a preferred method for generally implementing the architecture of the present invention;

FIG. 8 is a flow chart illustrating the operation of the clustering functions during the active mode shown in FIG. 7;

FIG. 9 is a flow chart illustrating the operation of a portion of the operation shown in FIG. 8;

FIGS. 10($a$), 10($b$), and 11 are flow charts illustrating the operation of clusters referred to in FIG. 9;

FIGS. 12–13 are flow charts illustrating a sleep mode utilized by the system of the present invention;

FIG. 14 is a table depicting the initial condition of a cluster in which all of the devices within the cluster are virgin devices; and FIG. 15 is a table depicting a subsequent condition of a cluster in which there are a number of regular devices and relatively fewer virgin devices are present.

DESCRIPTION OF THE PREFERRED EMBODIMENTS

Figure 1:
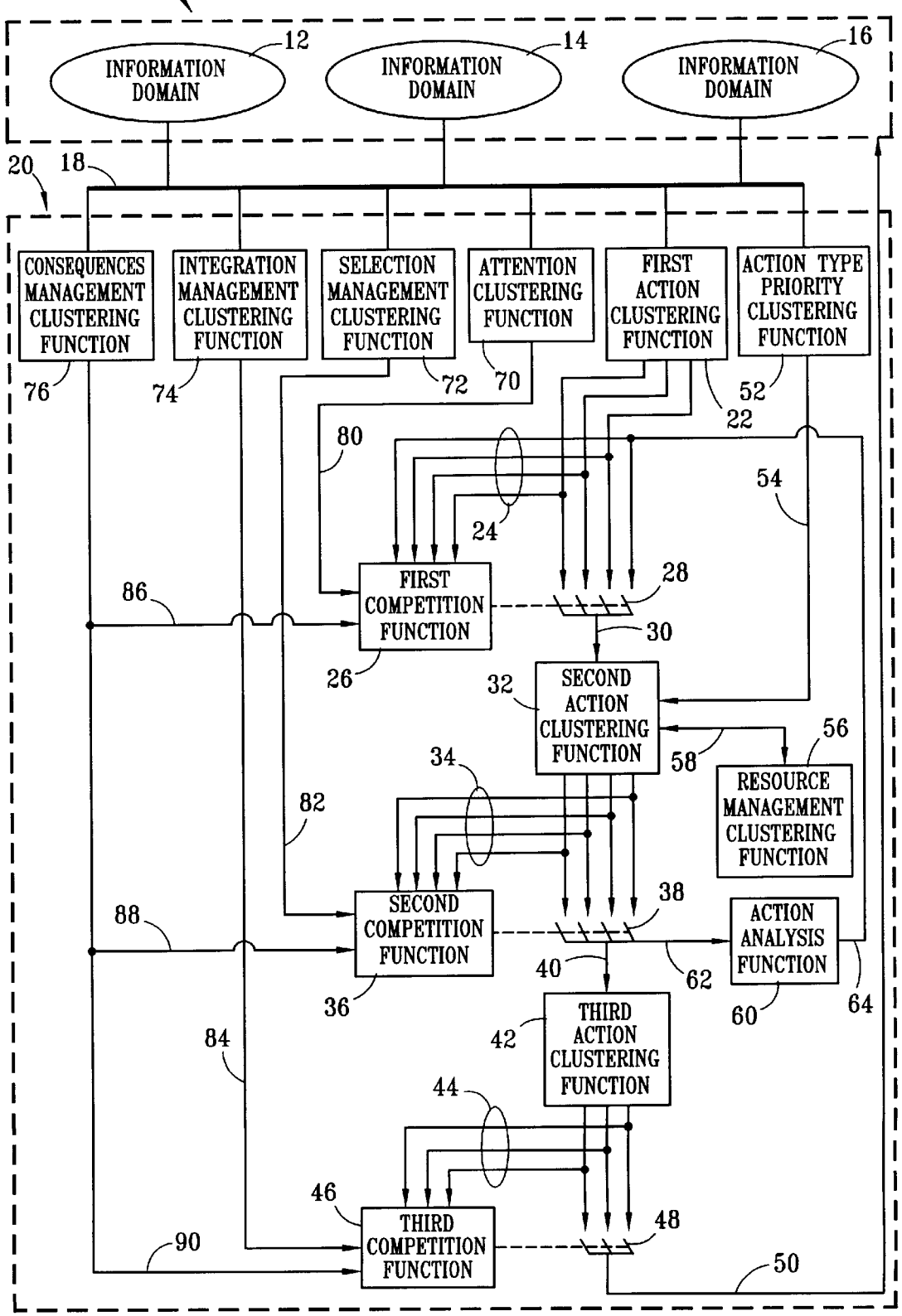
FIG. 1 is a schematic diagram showing an architecture embodying features of the present invention.

Referring to FIG. 1 of the drawings, the reference numeral 10 generally designates a network, such as a telephone and/or data network, which performs a complex combination of functionality using a large number of devices. The network 10 includes three information domains 12, 14, and 16, which provide information such as node location data, routing table data, traffic measurement data on selected routes between nodes, physical hardware layout, quality of service, combinations thereof, and the like, for monitoring the network. The domains 12, 14, and 16 may provide information which is unique to a respective domain, or the information may overlap, and the domains may be demarcated based upon the function of the information provided, the type of information provided, and/or by geography, and the like. The number of domains may also vary from three domains.

The network 10 is connected in a manner well known to those skilled in the art via a bus 18 connecting the information domains 12, 14, and 16 to a control system 20 comprising a recommendation architecture embodying features of the present invention. The control system 20 includes a first action clustering function 22, described below, connected via the bus 18 for receiving input from the information domains 12, 14, and 16 about the network 10. The clustering function 22 is connected for generating a plurality of output "recommendation" signals, each of which may comprise a plurality of bits, via a plurality of lines 24 (only four of which are shown) to a first competition function 26, described below, and to gates 28 configured for permitting a single recommendation signal selected by the competition function 24 to pass via a line 30 to a second action clustering function 32. In a similar manner, a second action clustering function 32 is connected for generating a plurality of output recommendation signals via a plurality of lines 34 to a second competition function 36 and to gates 38 configured for permitting a single recommendation signal selected by the competition function 34 to pass via a line 40 to a third action clustering function 42. Similarly, the third clustering function 42 is connected for generating a plurality of output recommendation signals via a plurality of lines 44 to a second competition function 46 and to gates 48 configured for permitting a single recommendation signal selected by the competition function 44 to pass via a line 50 to the network 10 for controlling the network 10.

The system 20 includes an action type priority clustering function 52 which is connected via the bus 18 to the information domains 12, 14, and 16. The action type priority clustering function 52 is configured for identifying internal needs of the system 20 such as cost effectiveness, labor redeployment, and the like, and for generating signals via a line 54 to the new second action clustering function 32 to bias the probability of action recommendations in response to the internal needs identified from the incoming data.

A resource management clustering function 56 is connected via the line 58 to the second action clustering function 32 for managing resources, such as clusters and devices discussed below, of the second action clustering function 32. Such a function is required by any action clustering function which heuristically modifies its own functionality.

An action analysis function 60 is connected via the line 62 to the gates 38 for receiving and analyzing a recommendation selected by the second competition function 36. The action analysis function 60 generates signals on the line 64 which simulate a condition in which the recommended action has been taken. The signals generated by the action analysis function 60 compete in the first competition function 26 for access through the gates 28, where they combine with signals from the first action clustering function 22, also received through the gates 28, to generate a modified recommendation to the second action clustering function 32.

The system 20 also includes three feedback functions, 70, 72, and 74, described further below, which are connected via the bus 18 to the information domains 12, 14, and 16. The function 70 is an attention management function which is connected via the line 84 to modulate the relative probability of recommendations on the lines 24 to pay attention to a different set of inputs gaining access through the gates 28 to the second action clustering function 32. The function 72 is a selection management function connected via a line 82 to modulate the relative probability of recommendations on the lines 34 to perform different actions on the network 10 gaining access through the gates 38 to the third action clustering function 62. The function 74 is an integration management function connected via a line 80 to modulate the relative probability of recommendations to integrate different action elements in different ways to perform the accepted action recommendation.

A consequences management function 76 is a clustering function connected to the bus 18 for receiving information indicating the state of the network 10 after an action has been taken. The function 76 generates signals on lines 86, 88 and 90 which modulate the probability of future input information similar of input information being similar to recent inputs generating actions through the gates 28, 38, and 48 similar to recently accepted action.

Figure 2:
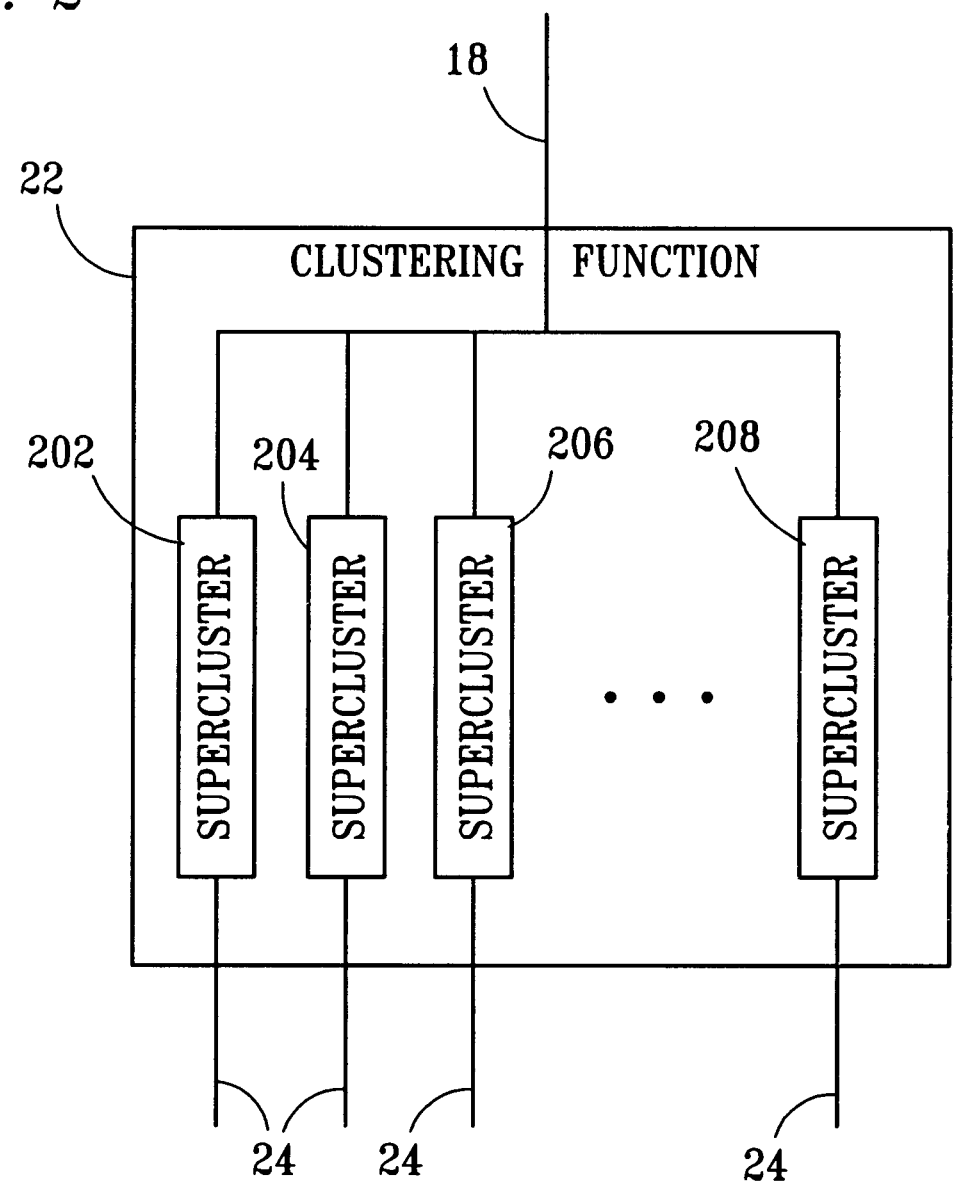
FIG. 2 is a schematic diagram showing the architecture of a clustering function shown in FIG. 1.

The general architecture of each of the clustering functions 22, 32, 42, 52, 56, 20 70, 72, 74, and 76 is substantially similar to each other and, for the sake of conciseness, is depicted representatively by the clustering function 22 in FIG. 2. As exemplified therein, the clustering function 22 includes four superclusters 202, 204, 206 and 208, described further below. While only four superclusters are shown in FIG. 2, the number of superclusters included within a clustering function may vary. Each of the clustering functions 22, 32,42, 52, 56, 70, 72, 74, and 76 generate recommendations which may perform an action on the network 10 or the system 20, and such recommendations pass through a separate competition function (not shown with respect to the clustering functions 52, 56, 70, 72, 74, and 76) before being accepted.

Figure 3:
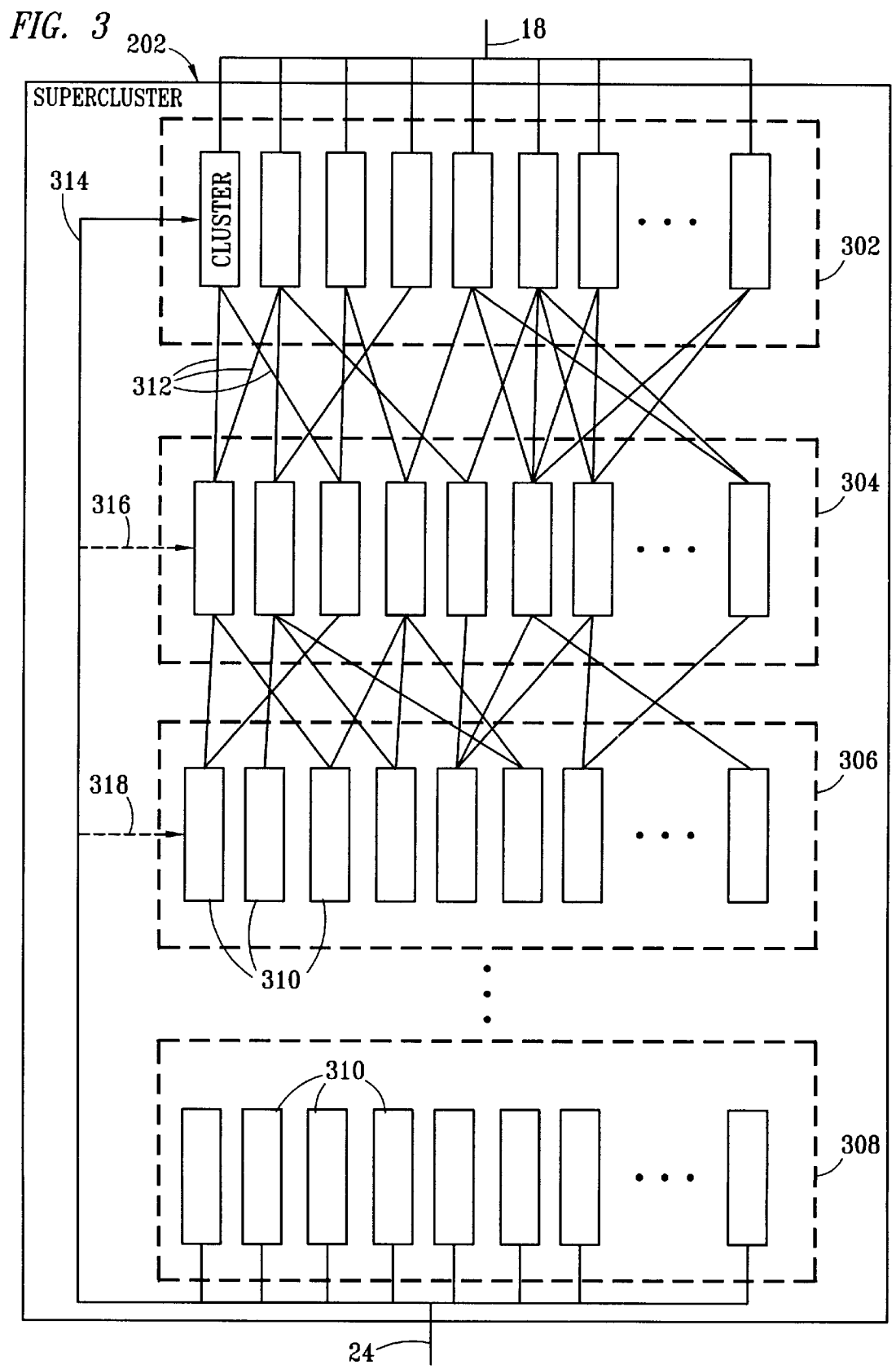
FIG. 3 is a schematic diagram showing the architecture of a supercluster shown in FIG. 2.

The general architecture of each of the superclusters 202, 204, 206, and 208 is substantially similar to each other and, for the sake of conciseness, is depicted representatively by the superclusters 202 in FIG. 3. As exemplified therein, the supercluster 202 includes four levels 302, 304, 306, and 308, each of which levels comprises a plurality of clusters 310, described in further detail below. While four levels of clusters are shown, the number of clusters included within the supercluster 202 may vary. In the operation of the clustering function 202, the clusters 310 of one level, such as the level 302, are interconnected with clusters on a next generally lower level (as viewed in FIG. 3), such as the level 304, as exemplified by the lines 312. Furthermore, a feedback loop 314 provides for interconnecting the output of the level 308 of clusters to a generally higher level (as viewed in FIG. 3) of devices, described below, of the level 302 of clusters 310. As indicated by the dashed lines 316, 318, and 320, the feedback loop 314 may also direct the output of the level 308 of clusters 310 to a level of devices of the level 304, 306, and/or 308 of clusters.

Figure 4:
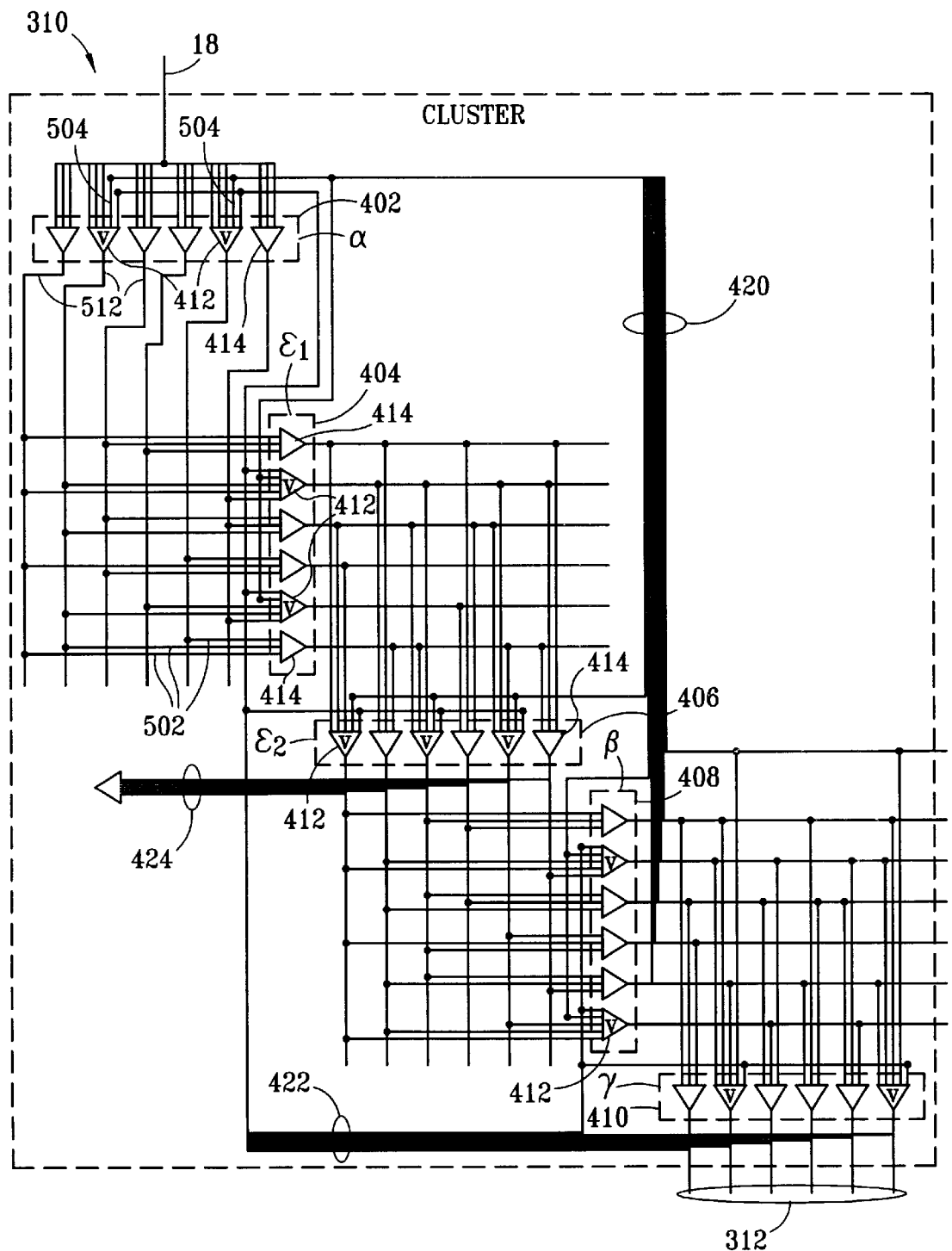
FIG. 4 is a schematic diagram showing the architecture of a cluster shown in FIG. 3.

FIG. 4 shows the architecture of a cluster 310. As exemplified therein, the cluster 310 preferably includes five functional layers, namely, an "alpha" layer 402, an "epsilon one" (referred to hereinafter as "$\epsilon 1$") layer 404, an "epsilon two" (referred to hereinafter as "$\epsilon 2$") layer 406, a "beta" layer 408, and a "gamma" layer 410, each of which layers preferably comprises a large number of "repetition" devices (six of which are shown in FIG. 4) for each layer, wherein the devices are either "virgin" devices such as device 412 (shown with a "V" imprinted on the device) or are "regular" devices such as device 414. While five functional layers of six devices each are shown, the number of layers and devices in each layer may vary. While not shown, all devices initially virgin devices 412 and there is no interconnection between them. Subsequent to the operation of the cluster 310, the virgin devices 412 become regular devices 414, as shown in FIG. 4, and are interconnected in a manner described below.

Figure 5:
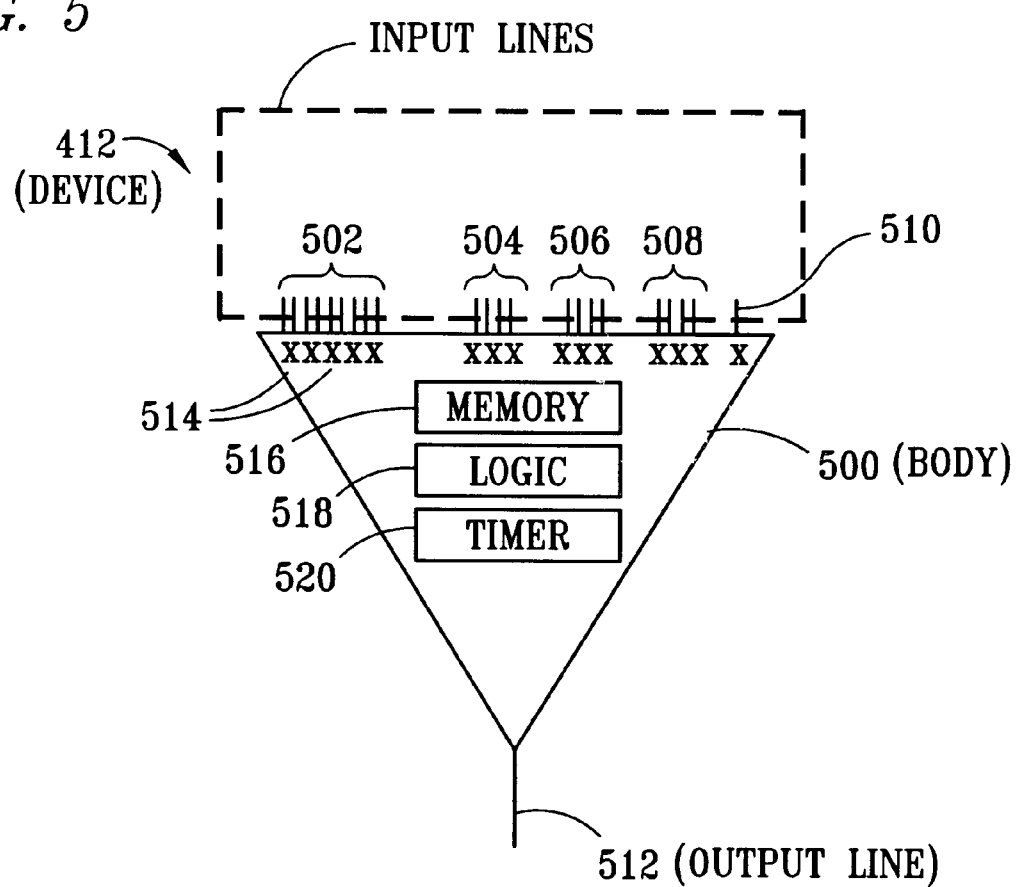

FIG. 5 shows details of a virgin device 412, which is representative of a regular device 414 as well. The device 412 includes a body 500, a plurality of input lines 502, 504, 506, 508, and 510, and a single output line 512. The input lines 502 are connected to the outputs of devices 414 in the gamma layer 410 of another, generally previous, cluster 310 or layer of regular devices 414. The input lines 504 are connected for receiving beta output from the same cluster, as described below, and the input lines 506 are connected for receiving gamma output from the same cluster. The input lines 508 are preferably used only in connection with devices in the ε1 layer 404 and are connected for receiving feedback via the feedback line 314 shown in FIG. 3 from the gamma outputs from higher clusters.

The line 510 is connected for receiving data on the line 54 to modulate a threshold which determines whether input received on the input lines 502 is sufficient to generate a signal on the output line 512. The output signal generated on the line 512 may be any of a number of different types of signals, such as, for example, a signal spike, a series of spikes occurring at a regular rate over an interval, a series of spikes with a regularly modulated rate of occurrence over an interval, or the like. The output signal generated on the line 512 is distributed to many of the devices 412 on a subsequent layer.

In one implementation of the device 412, signals on the input lines 502, 504, 506, 508, and 510 are received on different buses containing lines that are each divided into time slots. The presence and nature of all possible inputs to the lines 502, for example, are indicated by the contents of a particular time slot. Memory 516 indicates which time slots correspond to which inputs connected to devices 412 and also contains the value of the threshold value to be used. The logic module 518 determines each event of the number of inputs activated, plus a weighted number of beta signals received, less a weighted number of gamma signals received during the predefined time interval controlled by timer exceeding the threshold value stored in the memory. When such an event is identified by the logic module 518, an output on the line 512 is generated. A timer 520 is positioned in the body 500 for providing a time interval for receiving input and to compare with the threshold value stored in the memory 516 to determine whether the threshold value is exceeded. Such a timer 520 is well known, for example, in the implementation of neural networks, and will therefore not be described in further detail.

Referring again to FIG. 4, the input lines 502 (FIG. 5) of each virgin device 412 in a layer, such as the layer 404, are provisionally connected to one or more output lines 512 (FIG. 5) of a device in a previous layer, such as the layer 402. Subsequent to the operation of the cluster 310, the input line 512 (FIG. 5) of each regular device 414 in a layer such as the layer 404 (FIG. 4) is permanently connected, or "imprinted," to one or more output lines 512 of a device in a previous layer such as the layer 402. As discussed above, the input lines 502 of the devices in the alpha layer 402 may be connected to the output lines 512 of devices in previous clusters 310 (FIG. 3).

A beta output line 420 is connected to the output 512 of each regular device 414 on the beta layer 408 of the cluster 310, and also to the beta input lines 504 of each virgin device 412. Similarly, a gamma output line 422 is connected to the output 512 of each regular device 414 on the gamma layer 410 of the cluster 310, and also to the gamma input lines 506 of each virgin device 412. An external line 424 is connected to the output 512 of each regular device 414 on the ε2 layer 406 of the cluster 310. The external line 424 is also externally connected (i.e., outside of the cluster 310) as described below for inhibiting the formation of new clusters 310. The ε1 level receives inputs from the gamma output level of higher level clusters in FIG. 3 via lines 314, 316, 318 illustrated. These inputs are received by devices in ε1 which were imprinted at the same time as the gamma devices which are the source of the outputs. If an ε1 device is already producing an output and receives input of this type, it will continue to produce output. If it is producing output and does not receive this type of input it will stop producing output. This mechanism is only required if devices are programmed with multiple repetitions, and the function of the mechanism is to converge to the device activations within a supercluster on a set which have tended to be imprinted at similar times in the past. The functionality of a system with one repetition per device can be equivalent to one with multiple repetitions per device, the reason for multiple repetitions per device is to achieve more economical use of device resources.

An epsilon 2 output line 424 is connected for receiving the outputs generated by the devices 412 and 414 positioned in the epsilon to layer 406. The epsilon output line 424 is also connected to the resource management cluster and function 56. If the value on the line 424 exceeds a predetermined threshold value, then the resource management cluster function 56 inhibits the configuration of the virgin clusters when the system 20 is in the sleep mode.

While not shown, the layers of devices depicted in the cluster 310 of FIG. 4, may be subdivided into sublayers wherein the output 512 of devices 412 on one sublayer provide the input to devices on another sublayer within the same layer.

FIG. 5A schematically depicts the operation and interaction of the competition functions 26, 36, and 46. Because the competition functions 26, 36, and 46 are substantially similar, for the sake of conciseness, they will be described representatively by reference to the competition function 26. Accordingly, the competition function 26 comprises a plurality of channels 530, three of which are shown in FIG. 5A. Each channel 530 in me competitive function 26 is connected for receiving an input, representative of an action recommendation, from only one supercluster of a clustering function. As exemplified in FIG. 5A, the channels 530 are connected for receiving inputs via the lines 24 from a supercluster 202 of the clustering functions 22. While not shown, additional channels 530 within the competition function 26 may be connected for receiving additional inputs from additional superclusters of the same or additional clustering functions.

Each channel 530 of the competition function 26 comprises a plurality of layers of devices 412 and 414 interconnected similarly to the clusters depicted in FIG. 4 for stimulating the generation of output from forward layers within a respective channel and, additionally, for inhibiting, via inhibitive connections 534, the generation of output in all other channels. If, for example, inputs enter from three superclusters 202 of the first clustering function 22, corresponding with three alternative action recomendations, device outputs will be produced through several layers in each channel 530. The inhibitive connections 534 between channels 530 reduce the level of device activity in successive layers and, as shown by an arrow 532, a modulation function (not shown) applies a general adjustment to the level of all device thresholds until one and only one channel generates an output. Such generated output is used to open a corresponding gate 28 (FIG. 1) controlled by the competitive function 26 to allow all output from one corresponding supercluster (e.g., the supercluster 80) to proceed as input to the next clustering function (i.e., the second action clustering function 32 in the present example).

The consequences management function 76 clusters input generated from the system 20 after an action has been taken on the network 10, and recommends either increasing or decreasing the strength of inhibitive connections which were active in the aforementioned competitive selection, thereby effectively modulating the probability that a similar action will be selected under similar circumstances in the subsequent competitions. The construction of a competitive function, such as the competitive function 26, may employ conventional neural network techniques which are well-known in the art, and will therefore not be discussed in further detail herein The foregoing embodiment of the control system 20 may be implemented in either hardware, software, or a combination thereof Because the implementation details of the control system 20 are considered to be known to those skilled in the art based upon a review of the present description of the invention, the control system 20 will not be described in further detail herein.

Connection of the outputs 512 with the inputs 502 of the devices 412 and 414 within the cluster 310 is depicted in FIG. 4 is shown in FIGS. 14 and 15. FIG. 14 depicts the initial condition of the cluster 310 in which all of the devices within the cluster 310 are virgin devices 412. Since all devices are virgin devices 412, there are no beta or gamma signals (i.e., signals output from regular devices 414 in the beta or gamma layers 408 or 410, respectively) generated to either stimulate or inhibit the making of connections. Therefore, when a threshold of, for example, half, or three out of six inputs are activated, then virgin devices 412 are imprinted.

As shown m FIG. 14, there are 20 inputs 502 which may possibly be imprinted. Six inputs, 2, 7, 12, 14, 18, and 19 from the alpha layer 402 of a cluster 310 in the first action clustering function 22 are selected at random to be provisionally connected to data received from the bus 18. In the first two presentations shown less than three of the six selected inputs are activated and hence there is no imprinting. In the third presentation, three inputs, 2, 12, and 14, are activated; therefore, those three inputs are permanently connected, i.e., imprinted, and the virgin device 412 becomes a regular device 414. In presentations 4 and 5, there are three inputs which are activated, but since the activated inputs are not the imprinted inputs, a signal is not generated to the output line 512. In presentation 6, the three imprinted inputs 2, 12, and 14 are activated and, as a result, a signal is generated onto the output line 512, i.e., the device 414 fires. In presentation 7, the three imprinted inputs are activated and a fourth provisionally connected input 19 is also activated; therefore, the device 414 fires and the fourth input is also imprinted, thereby increasing the probability that the device will fire in the future when any three of the four imprinted inputs are activated. In presentation 9, three of four imprinted inputs are activated thereby causing the device 414 to fire. And in presentation 10, no three of the four imprinted inputs are activated, thereby resulting in the device 414 not firing. It is noted that because the device fires when imprinted inputs are activated with the same data that resulted in them being imprinted, such data is referred to herein as a repetition of such data.

FIG. 15 depicts a subsequent condition of the cluster 310 in which there are a number of regular devices 414 and relatively fewer virgin devices 412 are present. As shown, eight inputs are provisionally connected to a virgin device 412. In presentation 1, a strong gamma signal received on the line 506 and a strong beta signal received on the line 504 are present with seven active inputs. The strong beta signal stimulates the imprinting of the provisional connections is offset by the strong gamma signal which inhibits imprinting; therefore, notwithstanding the seven activated inputs, there is no imprinting and no firing from the virgin device 412. In presentation 2, there is a weak or no beta signal to the device, with a strong gamma signal to inhibit imprinting; therefore, there is no imprinting. As noted in FIG. 15, notwithstanding the number of activated inputs, if the gamma signal to inhibit imprinting is strong, then no imprinting occurs. In presentation 3, there is a strong beta signal to stimulate imprinting, and a weak gamma signal to inhibit imprinting, and four activated inputs; therefore, the four activated inputs are imprinted. A threshold is also set within the memory 516 of the device to be less than or equal to the number of inputs imprinted, such as a threshold of three, and the device becomes a regular device 414. Subsequent to presentation 3, wherein the activated inputs were imprinted, the strength of the beta and gamma signals is irrelevant to whether the device fires. Accordingly, in presentations 4 and 6, less than three inputs are imprinted and so there is no firing. And in presentation 5, regardless of the beta and gamma signals, the device fires because three inputs are activated, the device fires.

It is noted with respect to the foregoing in FIG. 15, that if the output of a virgin device 412 in the alpha layer 402 is provisionally connected to the input of a regular device 414 in the next layer of devices, and the regular device 414 is firing at the same time the virgin device 412 is imprinted, then the provisional connection becomes permanent. Alternatively, if the regular device 414 does not fire at the same time the virgin device 412 is imprinted, then the provisional connection is deleted.

FIGS. 6–13 are flow charts of a method of implementing the system 20 in accordance with the above-described features of the present invention. Referring to FIG. 6, operation of the control system 20 generally alternates between an "active" mode and a "sleep" mode. As depicted in FIG. 6, operation of the system 20 may be considered to begin at step 600 by entering into the active mode. During the active mode, operation proceeds to step 602 which is shown in greater detail in FIG. 7.

Figure 7B:
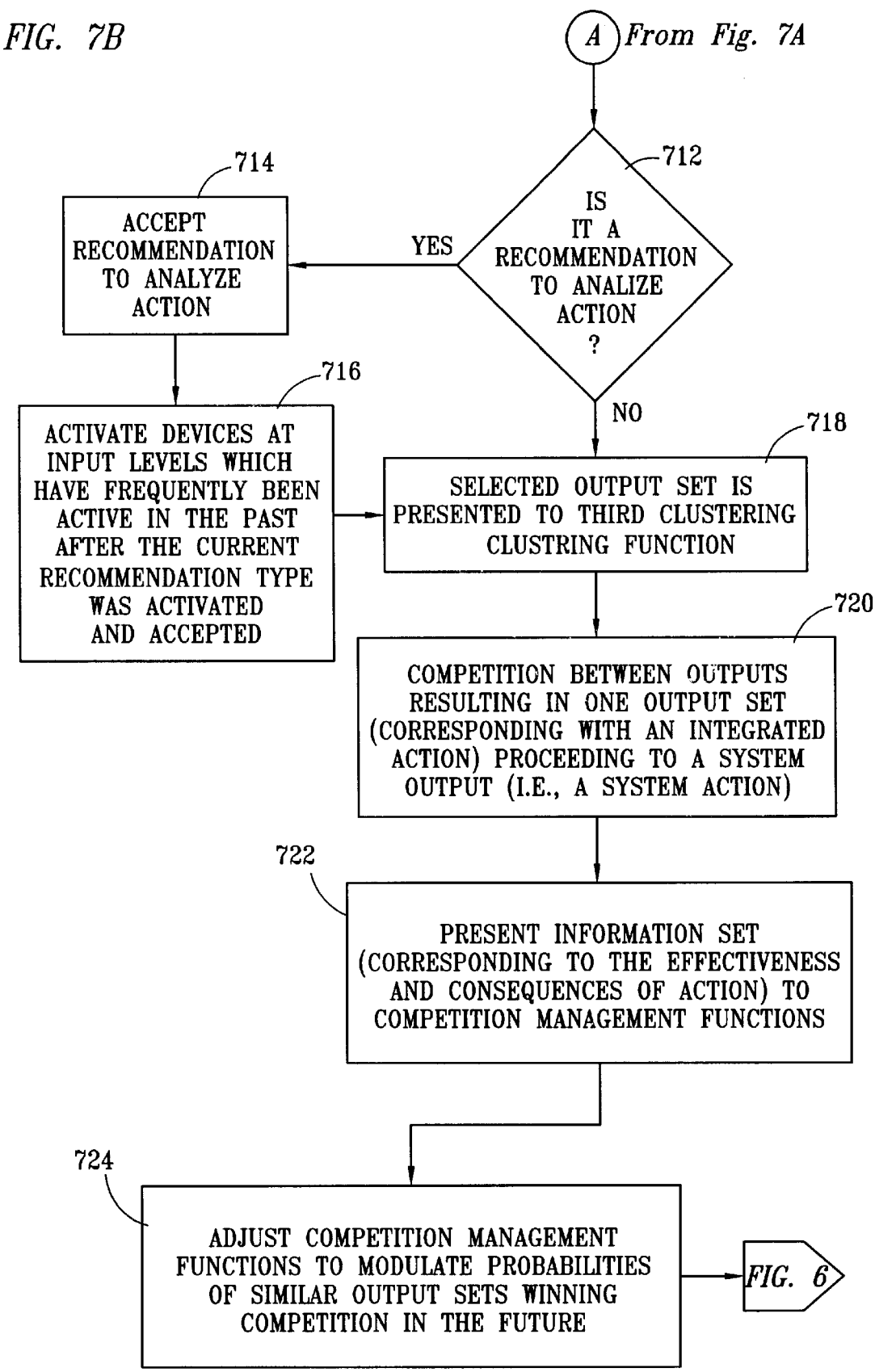
FIG. 7 is a flow chart illustrating an active mode utilized by the system of the present invention.

Referring to FIG. 7, operation in the active mode proceeds to steps 700 and 702 which are performed in parallel. Beginning with step 702, information about the network 10 from the information domains 12, 14, and 16, is presented via the bus 18 to the first action clustering function 22. The presentation of such information will be referred to herein as a data repetition. Recommendations performed by the system 20 will occur, based upon a repetition of the information.

As shown more clearly in FIG. 8, the step 702 is performed in parallel by steps 802, 804, 806, and 808, wherein the information set is presented to each of the superclusters of a clustering function, such as the four superclusters 202, 204, 206 and 208 shown in FIG. 2. Execution of the steps 802, 804, 806, and 808 is shown in greater in FIG. 9.

With reference to FIG. 9, execution proceeds from a respective step 802, 804, 806, or 808 to step 906 wherein repetition input received from the bus 18 is presented to all clusters 310 in the first cluster level 302 (FIG. 3) of a supercluster 202 (FIG. 2). The clusters in the first cluster level 302 then produce repetition output which, in step 908, is input to all clusters 310 in the second cluster level 304 (FIG. 3). The clusters in the second cluster level 304 then produce repetition output which, in step 910, is input to all clusters 310 in the third cluster level 306 (FIG. 3). The clusters in the third cluster level 306 then produce repetition output which, in step 912, is input to all clusters 310 in the fourth cluster level 308 (FIG. 3).

Upon completion of step 912, execution proceeds to step 904, wherein a determination is made whether each of the regular (non-virgin) devices 414 in the supercluster 202 contains multiple repetitions. If it is determined that there each of the devices 412 contains multiple repetitions, then execution proceeds to step 914; otherwise, execution proceeds to step 922.

In step 914, consistency output is presented from the gamma layer 410 of the fourth level 308 to the $\epsilon 1$ layer of the first level 302 of the supercluster 202 shown in FIGS. 3–4. In step 916, a determination is made whether consistency input is present in the first level 302 or if no output is present in any cluster in the fourth level 308. If in step 916, a determination is made that consistency input is not present in the first level 302 and that output is present in at least one cluster in the fourth level 308, then execution returns to step 914. If in step 916, a determination is made either that consistency input is present in he first level 302 or that no output is present in at least one cluster in the fourth level 308, then execution proceeds to step 922 to imprint at every level of the supercluster 202 (FIG. 3) until a minimum output is present at the fourth level 308 of the supercluster 202. The step 922 is described in greater detail below with respect to FIG. 10A.

Referring to FIG. 10A, execution of step 922 begins at step 1000 and proceeds to step 1001 wherein a determination is made whether the supercluster 202 has generated any output. If it is determined that output has been generated by the supercluster 202, then execution proceeds to step 1002, wherein the generated output is sent to the next competitive function (described above with respect to FIG. 5A). Upon completion of step 1002, execution returns to step 922 and then proceeds to step 926 of FIG. 9.

If, in step 1000, it is determined that no output has been generated by the supercluster 202, then execution proceeds to step 1004, wherein a determination is made whether the virgin device 412 minimum thresholds have been reached. If it is determined that the minimum virgin device thresholds have been reached, then no output is sent to the next competitive function (FIG. 5A), and execution returns to step 927 and then proceeds to step 926 of FIG. 9.

If, in step 1004, it is determined that the virgin device 412 minimum thresholds have not been reached, then execution proceeds to step 1008, wherein the minimum threshold is lowered on all virgin devices 412. Upon completion of step 1008, execution proceeds to step 1010 wherein all levels of the supercluster 202 are imprinted. The step 1010 is described in greater detail below with respect to FIG. 10B.

Referring to FIG. 10B, execution of step 1010 begins at step 1020 and proceeds to step 1022 wherein a level pointer is set to the first level 302 of the supercluster 202. In step 1024, a determination is made whether the beta output from one or more clusters 310 in the current level of the supercluster 202 exceeds the cluster similarity criterion. If the beta output does not exceed the cluster similarity criterion, then execution proceeds to step 1026 wherein a determination is made whether the alpha or the epsilon output exceed the familiarity criterion in one or more clusters in the current level within the supercluster 202. If the alpha or the epsilon output exceed the familiarity criterion, then execution proceeds to step 1028 wherein a record is made that one instance of cluster inhibitions has occurred for resource programming phase. In step 1030, the level pointer is incremented and execution returns to step 1024.

If, in step 1026, it is determined that no alpha or the epsilon output exceeds the familiarity criterion in one or more clusters in the current level within the supercluster 202, then execution proceeds to step 1032. In step 1032, a determination is made whether the input to the current level contains any bias information from any available new cluster. If the input does not contain any such bias information then execution proceeds to step 1034, wherein the level input data is recorded for future clusters. Execution then proceeds from the step 1034 to the step 1030, discussed above.

If, in step 1032, it is determined that the input does contain bias information, then execution proceeds to step 1036, wherein the output from the new cluster is imprinted and produced. Execution then proceeds to step 1040, discussed below.

If, in step 1024, it is determined that the beta output from one or more clusters 310 in the current level of the supercluster 202 exceeds the cluster similarity criterion, then execution proceeds to step 1038, wherein the clusters are imprinted to produce larger outputs. The step 1038 is described in greater detail below with respect to FIG. 11.

Figure 11A:
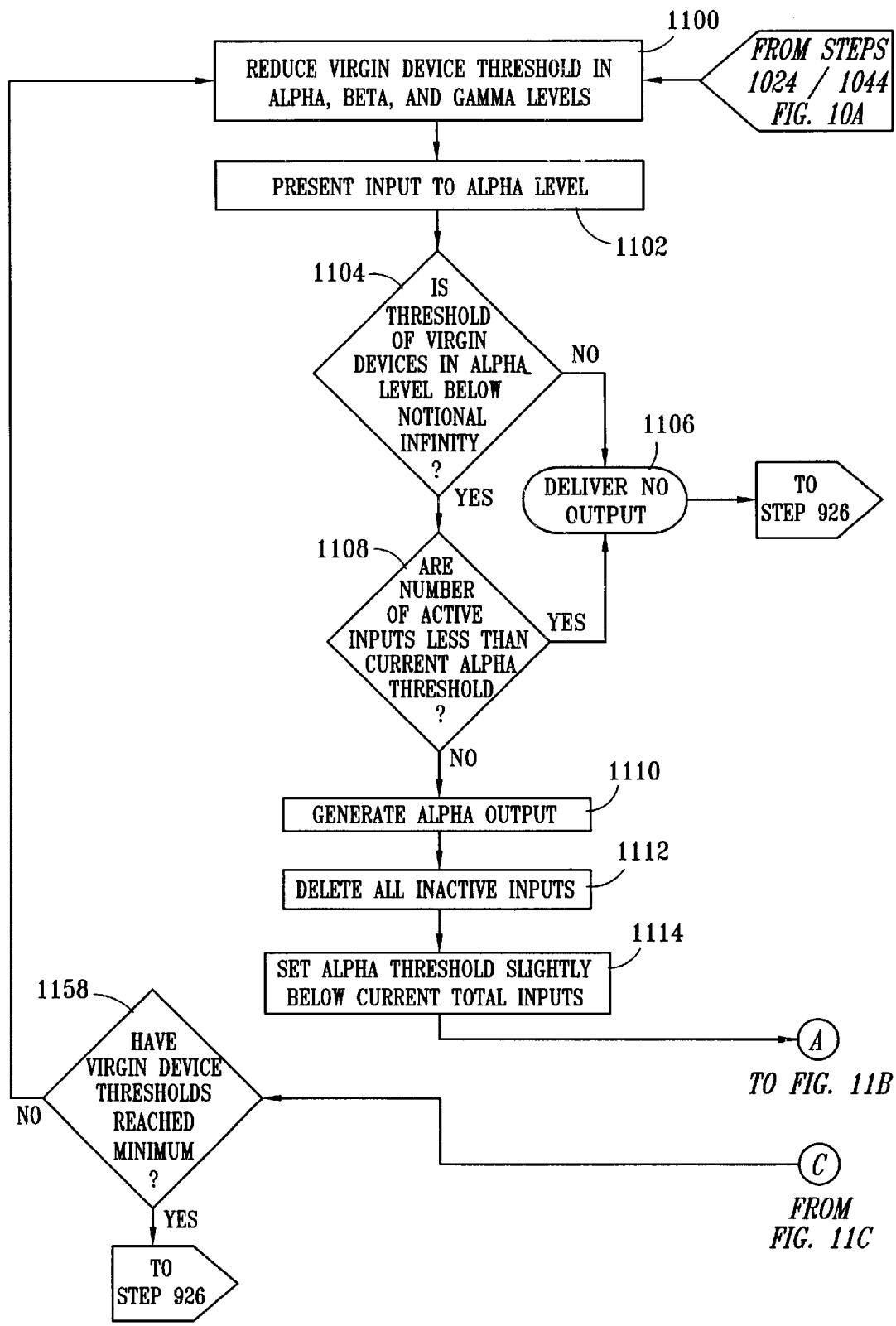
Figure 11B:
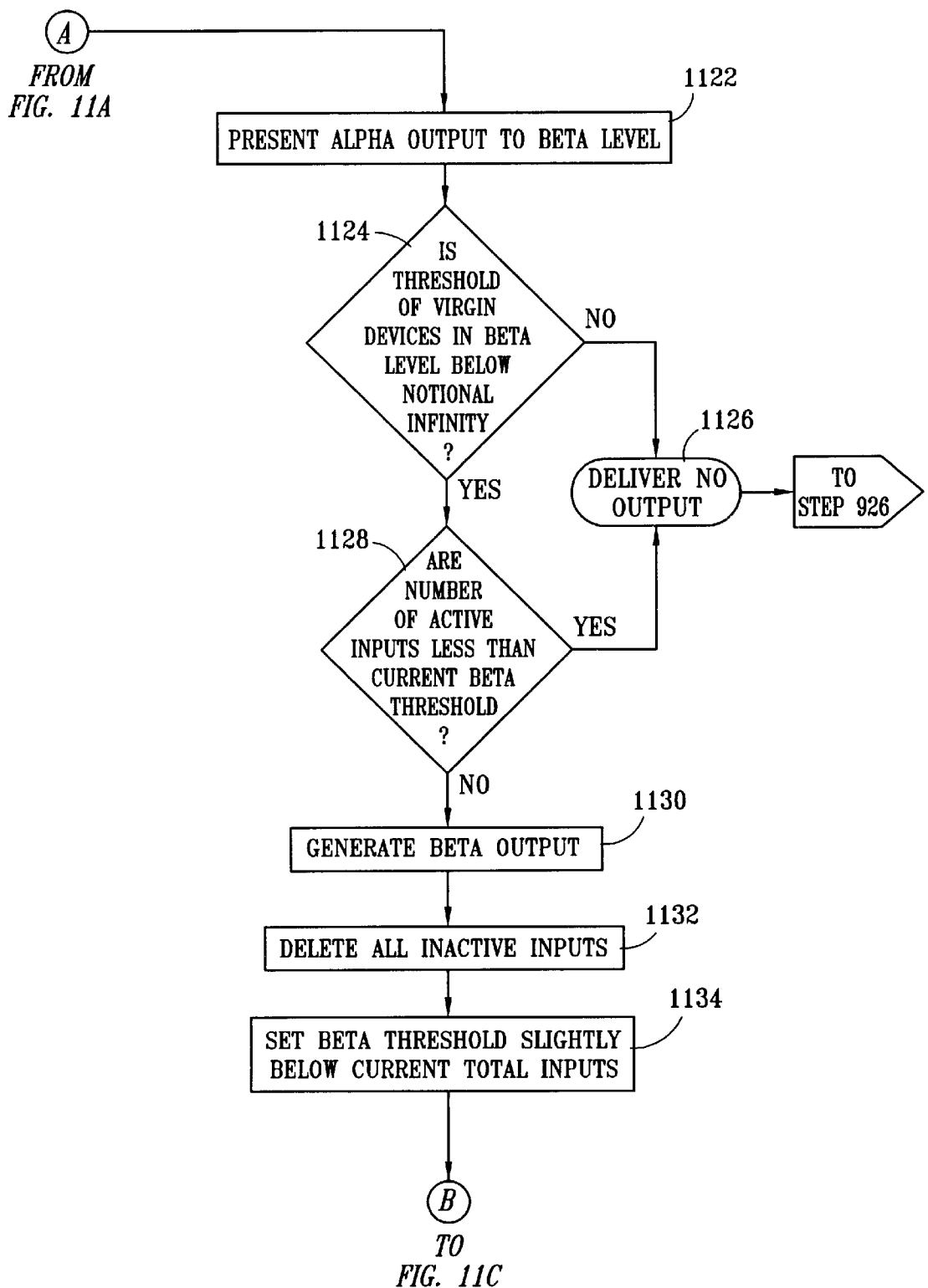
Figure 11C:
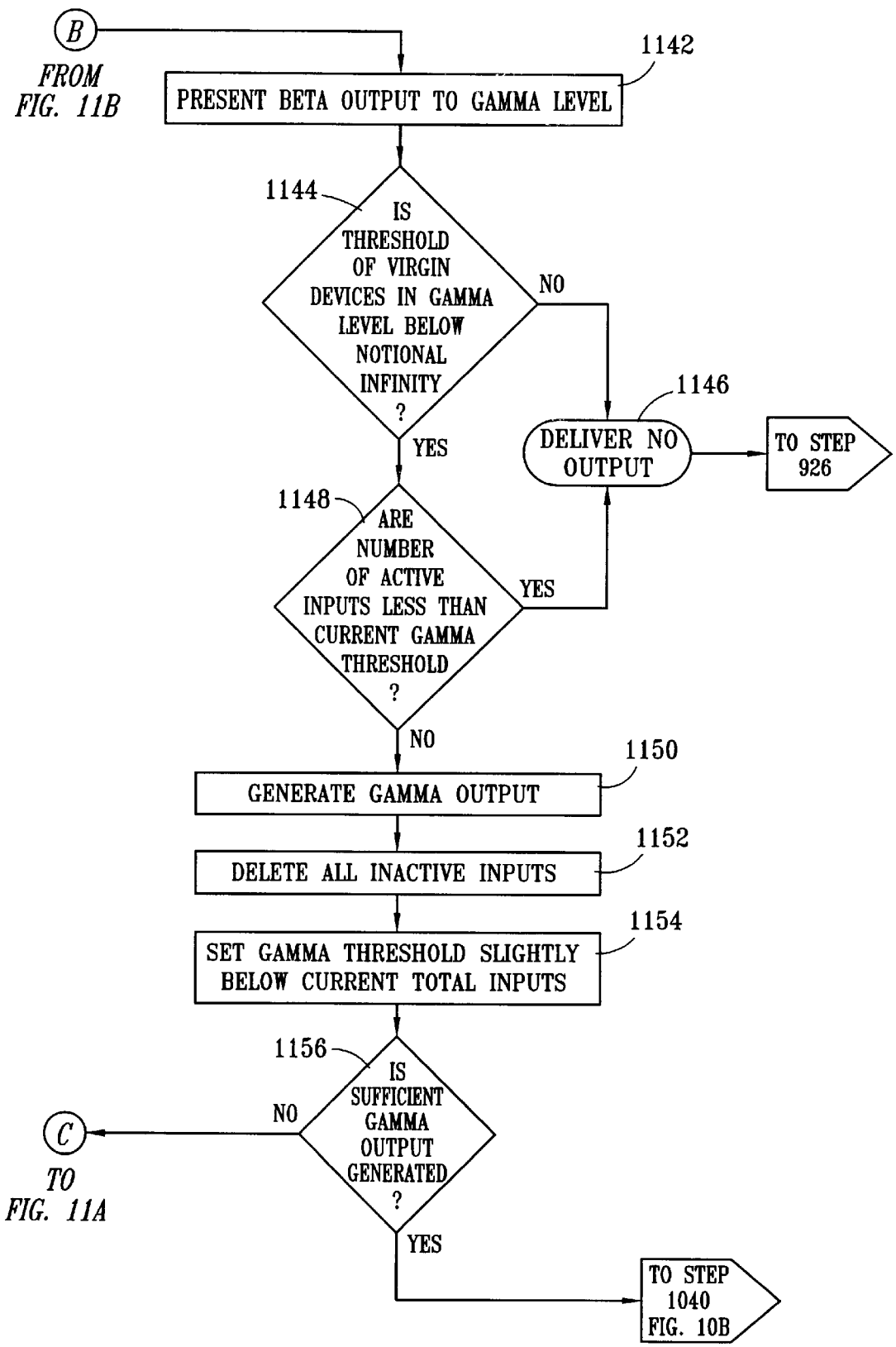

Referring to FIG. 11, execution of step 1010 begins at step 1100 wherein the thresholds of the virgin devices 412.

Referring to FIG. 11, at step 1100, the thresholds of the virgin devices 412 are reduced, and in step 1102, input is presented to devices 412 in the alpha layer 402. At step 1104, a determination is made whether the threshold value stored in the memory 516 of the virgin devices 412 in the alpha layer 402 is below a notional (effective) infinity. If at the step 1104, a determination is made that the threshold value stored in the memory 516 of the virgin devices 412 in the alpha layer 402 is not below a notional infinity, then no output is delivered and operation returns to step 906 in FIG. 9. If at the step 1104, a determination is made that the threshold value stored in the memory 516 of the virgin devices 412 in the alpha layer 402 is below a notional infinity, then operation proceeds to step 1108, wherein a determination is made whether the number of active inputs is less than the current threshold in the devices 412 on the alpha layer 402. If a determination is made that the number of active inputs is less than the current threshold in the devices 412, then operation proceeds to step 1106 wherein no output is delivered and operation returns to step 906 in FIG. 9. If a determination is made that the number of active inputs is not less than the current threshold in the devices 412, then operation proceeds to step 1110 and output is generated from the virgin devices 412 at the alpha layer 402. Operation then proceeds to step 1112, in which all inactive inputs at the alpha layer 402 are deleted, and to step 1114 in which the alpha threshold is set slightly below the current total inputs.

Upon execution of step 1114, operation proceeds to step 1122 wherein input is presented to devices 412 in the beta layer 408. At step 1124, a determination is made whether the threshold value stored in the memory 516 of the virgin devices 412 in the beta layer 408 is below a notional infinity. If at the step 1124, a determination is made that the threshold value stored in the memory 516 of the virgin devices 412 in the beta layer 408 is not below a notional infinity, then no output is delivered and operation returns to step 906 in FIG. 9. If at the step 1124, a determination is made that the threshold value stored in the memory 516 of the virgin devices 412 in the beta layer 408 is below a notional infinity, then operation proceeds to step 1128 wherein a determination is made whether the number of active inputs is less than the current threshold in the devices 412 on the beta layer 402. If a determination is made that the number of active inputs is less than the current threshold in the devices 412, then operation proceeds to step 1126 wherein no output is delivered and operation returns to step 906 in FIG. 9. If a determination is made that the number of active inputs is not less than the current threshold in the devices 412, then operation proceeds to step 1130 and output is generated from the virgin devices 412 at the beta layer 408. Operation then proceeds to step 1132 in which all inactive inputs at the beta layer 408 are deleted, and to step 1134 in which the beta threshold is set slightly below the current total inputs.

Upon execution of step 1134, operation proceeds to step 1142 wherein input is presented to devices 412 in the gamma layer 410. At step 1144, a determination is made whether the threshold value stored in the memory 516 of the virgin devices 412 in the gamma layer 410 is below a notional infinity. If at the step 1144, a determination is made that the threshold value stored in the memory 516 of the virgin devices 412 in the gamma layer 410 is not below a notional infinity, then no output is delivered and operation returns to step 906 in FIG. 9. If at the step 1144, a determination is made that the threshold value stored in the memory 516 of the virgin devices 412 in the beta layer 408 is below a notional infinity, then operation proceeds to step 1148 wherein a determination is made whether the number of active inputs is less than the current threshold in the devices 412 on the gamma layer 410. If a determination is made that the number of active inputs is less than the current threshold in the devices 412, then operation proceeds to step 1146 wherein no output is delivered and operation returns to step 906 in FIG. 9. If a determination is made that the number of active inputs is not less than the current threshold in the devices 412, then operation proceeds to step 1150 and output is generated from the virgin devices 412 at the gamma layer 410. Operation then proceeds to step 1152 in which all inactive inputs at the gamma layer 410 are deleted, and to step 1154 in which the gamma threshold is set slightly below the current total inputs.

It is noted that, while the foregoing steps 1102–1114, 1122–1134, and 1142–1154 have been performed with respect to the alpha, beta, and gamma layers, they may also be performed with respect to the s1 and s2 layers, 404 and 406, respectively, shown in FIG. 4.

Upon execution of the step 1154, execution proceeds to step 1156 wherein a determination is made whether gamma output is generated. If in the step 1156, it is determined that gamma output is generated, then execution proceeds to step 1008 of FIG. 10. If in the step 1156, it is determined that gamma output is not generated, then execution proceeds to step 1158 in which a determination is made whether virgin device thresholds have reached a minimum value. If in step 1158, a determination is made that virgin device thresholds have not reached a minimum value, then execution returns to step 1100. If in step 1158, a determination is made that virgin device thresholds have reached a minimum value, then execution returns to step 906 of FIG. 9.

Upon return from step 1156 to step 1039 in FIG. 10B, execution proceeds to step 1040, wherein the larger output is sent to the next level of the supercluster 202. Execution then proceeds to step 1042 wherein a determination is made whether the current level is the last level. If it is determined that the current level is not the last level, then execution proceeds to step 1044, wherein a determination is made whether the beta output exceeds the cluster similarity criterion in one or more current clusters in the last level. If it is determined that the beta output exceeds such similarity criterion, then execution returns to step 1038; otherwise execution returns to step 1026. If, in step 1042, it is determined that the current level in the supercluster is the last level, then execution proceeds to step 1010 and returns to step 1001 of FIG. 10.

Upon completion of step 922, execution proceeds to step 926, in which output generated by the fourth level 308 is presented to the first competition function 26 shown in FIG. 1. Upon execution of step 926, execution proceeds to a respective step 812, 814, 816, or 818 (FIG. 8) corresponding to the step 802, 804, 806, or 808 (FIG. 8) from which entry was made to the step 906 of FIG. 9.

Upon execution of steps 812, 814, 816, and 818, execution proceeds to step 820 wherein output from all superclusters 202–208 is presented to its respective next competition function. At step 822, the competition function 26 selects the output from one supercluster and presents that output to the next clustering function. Upon execution of the step 822, execution proceeds to the step 704 of FIG. 7.

Referring to FIG. 7, at step 704, competition between outputs resulting in one output set (corresponding to one condition) id presented to the second clustering function. In step 706, selected output from the first clustering function 26 is presented to the second clustering function 32. In step 708, competition between outputs from the second action clustering function 32 results in one output set (corresponding with one action recommendation) proceeding to the third clustering function 42. While not shown in FIG. 7, steps 706–708 are performed in a similar manner that steps 702–704 were performed by executing steps depicted in FIG. 8.

As discussed above, step 700 is executed in parallel with the step 702 to present one information set from preselected information, such as, to the action type priority clustering module 52. Upon execution of step 700, execution proceeds to step 710 wherein competition between outputs results in one output set (corresponding with a recommendation of a type of action) presented to the second action clustering function 32. The output set generated in the step 710 is used in the steps 704, 706, and 708 to modulate the relative probability of the type of conditions being selected, the superclusters producing strong recommendations to reduce the thresholds of devices in superclusters targeted by the output of action type priority clustering functions, and the action type being accepted.

Upon execution of steps 708 and 710, execution proceeds to step 712 wherein a recommendation is made whether to the analyze the action recommended by the second clustering function 32. If, in step 712, a recommendation is made to the analyze the action recommended by the second clustering function 32, then execution proceeds to step 714 wherein the recommendation to analyze is accepted, and to step 716 wherein devices 414 are activated if they have frequently been active in the past after the current recommendation type has been previously activated and accepted. Execution then proceeds to step 718. If, in step 712, a recommendation is not made to the analyze the action recommended by the second clustering function 32, then execution proceeds to step 718.

In step 718, the selected output set is presented to the third clustering function 42 and, in step 720, competition between outputs results in one output set (corresponding with an integrated action) which is presented as a system output (i.e., a system action) to the network 10. While not shown in FIG. 7, steps 718–720 are performed in a similar manner that steps 702–704 were performed by executing steps depicted in FIG. 8.

In step 722, an information set (corresponding to the effectiveness and consequences of an action) is presented to the competition management clustering function 76. In step 724, the competition management functions are adjusted to modulate the probabilities of similar output sets winning subsequent competitions. Execution then proceeds to step 604 in FIG. 6.

Referring to FIG. 6, in step 604, a determination is made whether the number of virgin devices have been depleted to, for example, less than 10 percent of their value at the beginning of the current active mode. If, in step 604, a determination is made that the number of virgin devices have not been depleted to less than 10 percent of their value at the beginning of the current active mode, then execution returns to step 602. If, in step 604, a determination is made that the number of virgin devices have been depleted to less than 10 percent of their value at the beginning of the current active mode, then execution proceeds to step 606.

In step 606, the system 20 enters into a sleep mode in which it, in step 608, prepares resources for another active mode. The sleep mode is executed in FIGS. 12–13.

Referring to FIG. 12, in step 1200, execution proceeds to the first supercluster 202 as the selected supercluster. In step 1202, execution proceeds to the first level of clusters 310 in the selected supercluster 202. In step 1204, a determination is made whether there are a significant number of presentations in the series of presentations experienced in the previous active mode with ow alpha output and no available new clusters. If, in step 1204, it is determined that there were a significant number of presentations in the series of presentations experienced in the previous active mode with low alpha output and no available new clusters, then execution proceeds to step 1206 wherein a new cluster is configured with random connectivity but with the alpha inputs biased toward inputs which frequently occurred together in such previous presentations. Execution then proceeds to step 1208 where attention is directed to the first cluster 310 of the selected supercluster 202. If, in step 1204, it is determined that there were not a significant number of presentations, in the series of presentations experienced in the previous active mode, with low alpha output and no available new clusters, then execution proceeds to step 1208.

Upon execution of step 1208, execution proceeds to step 1210 wherein a determination is made whether there are a significant number of presentations in the previous series of presentations with high alpha output, no gamma output from any cluster on the same level, and enough beta to trigger imprinting in any cluster. If, in step 1210, it is determined that a significant number of presentations in the previous series of presentations have with high alpha output, no gamma output from any cluster on the same level, and enough beta to trigger imprinting in any cluster, then execution proceeds to step 1212 wherein the similarity criterion for the current cluster is lowered. Execution then proceeds to step 1214. If, in step 1210, it is determined that a significant number of presentations in the previous series of presentations did not have high alpha output, gamma output from any cluster on the same level, or not enough beta to trigger imprinting in any cluster, then execution proceeds to step 1214.

At step 1214, a determination is made whether the current cluster is the last cluster. If, at the step 1214, it is determined that the current cluster is not the last cluster, then, in step 1216, attention is directed to the next cluster, and execution returns to step 1210. If, at the step 1214, it is determined that the current cluster is the last cluster, then execution proceeds to step 1300 on FIG. 13.

Figure 13A:
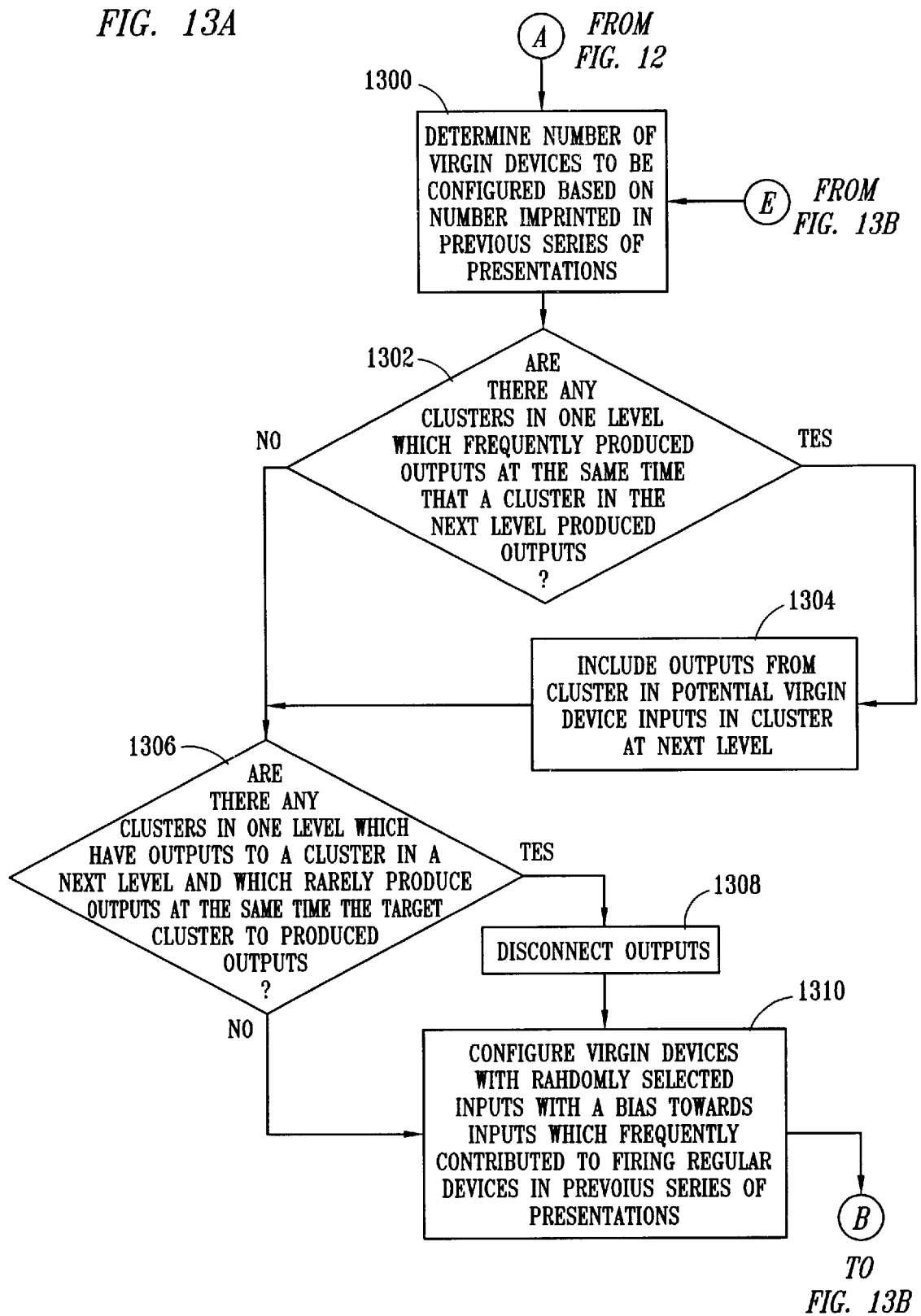
Figure 13B:
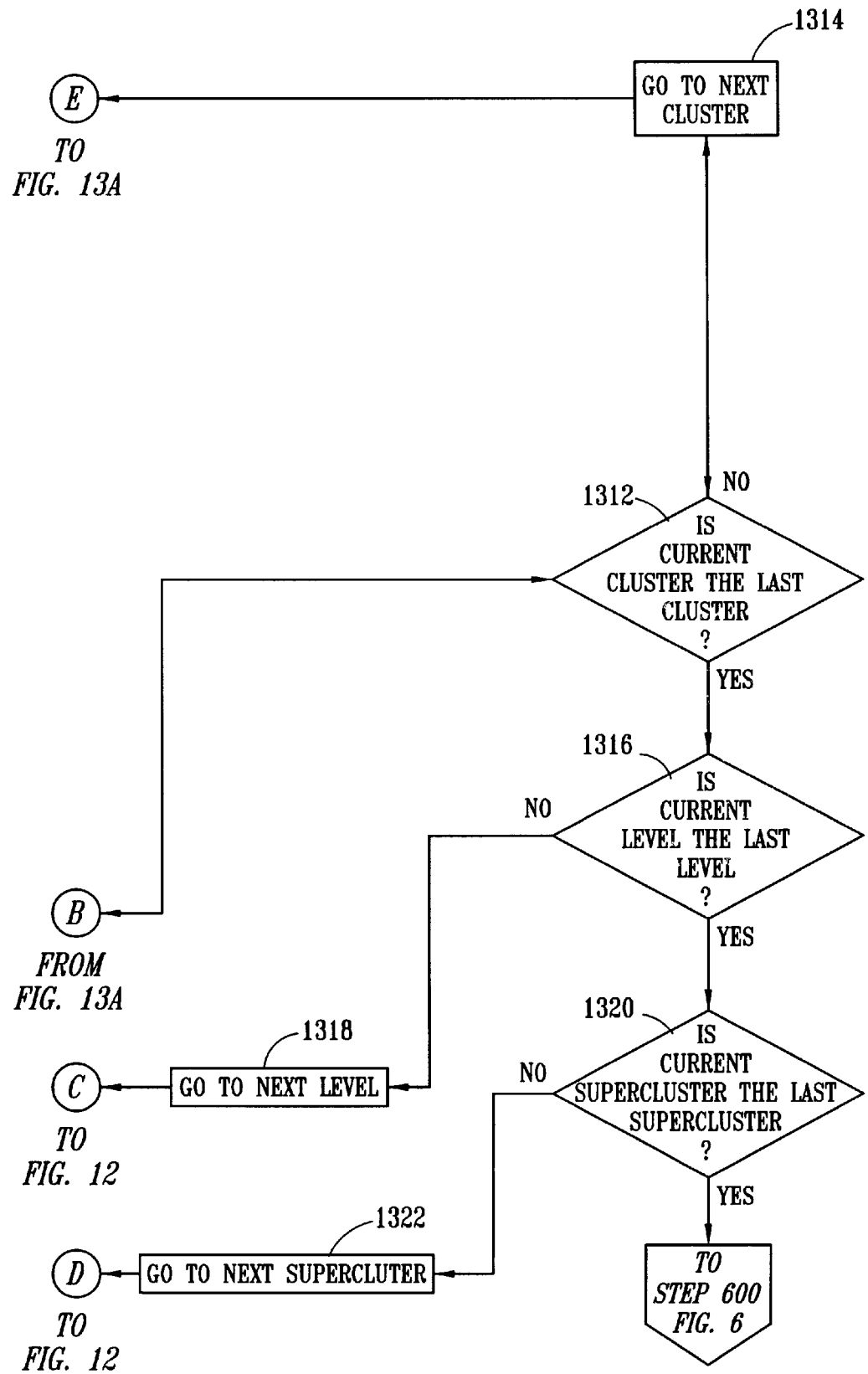

Referring to FIG. 13, at step 1300, a determination is made of the number of virgin devices to be configured based on the number of virgin devices imprinted during the previous active mode. In step 1302, a determination is made whether there are any clusters in one level 302, 304, or 306 which frequently produced outputs at the same time that a cluster in the next level 304, 306, or 308 produced outputs. If, in step 1302, it is determined that there are clusters in one level 302, 304, or 306 which frequently produced outputs at the same time that a cluster in the next level 304, 306, or 308 produced outputs, then execution proceeds to step 1304 wherein the outputs from the cluster in potential virgin device inputs are included in clusters at the next level. Execution then proceeds to step 1306. If, in step 1302, it is determined that there are not clusters in one level 302, 304, or 306 which frequently produced outputs at the same time that a cluster in the next level 304, 306, or 308 produced outputs, then execution proceeds to step 1306.

At step 1306, a determination is made whether there are any clusters in one level which have outputs to a cluster in a next level and which rarely produce outputs at the same time that the target cluster produces outputs. If, in step 1306, it is determined that there are clusters in one level which have outputs to a cluster in a next level and which rarely produce outputs at the same time that the target cluster produces outputs, then in step 1308, the outputs are disconnected. Execution proceeds to step 1310. If, in step 1306, it is determined that there are no clusters in one level which have outputs to a cluster in a next level and which rarely produce outputs at the same time that the target cluster produces outputs, then execution proceeds to step 1310.

At step 1310, virgin devices 412 are configured with randomly selected inputs with a bias towards inputs which frequently contributed to firing regular devices in the previous active mode. Execution then proceeds to step 1312 in which a determination is made whether the current cluster is the last cluster. If, in step 1312, it is determined that the current cluster is not the last cluster, then execution proceeds to step 1314 in which attention is directed to the next cluster, and then execution returns to step 1300. If, in step 1312, it is determined that the current cluster is the last cluster in the level of clusters, then execution proceeds to step 1316, in which a determination is made whether the current level is the last level in the current supercluster. If, in step 1316, it is determined that the current level is not the last level, then execution proceeds to step 1318 in which attention is directed to the next level, and then execution returns to step 1208 on FIG. 12. If, in step 1316, it is determined that the current level is the last level, then execution proceeds to step 1320 in which a determination is made whether the current supercluster is the last supercluster. If, in step 1320, it is determined that the current supercluster is not the last supercluster in the level of clusters, then execution proceeds to step 1322 in which attention is directed to the next supercluster and execution proceeds to step 1202 on FIG. 12. If, in step 1320, it is determined that the current supercluster is the last supercluster, then execution returns to step 600 and the system re-enters into the active mode.

By the use of the present invention, managing complex telecommunications networks may be performed for extremely complex combinations of functions in which the functions can be modified by the system in response to experience.

It is understood that the present invention can take many forms and embodiments. Accordingly, several variations may be made in the foregoing without departing from the spirit or the scope of the invention. For example, the present invention may be used with any system that requires handling of large amounts of data such as searching the internet or large databases. It may also respond appropriately to voice communications, language translation, and operate machinery in a rapidly changing environment such as driving a car or operating weapons in battle.

In addition to the foregoing discussion and description, the present invention is further described and disclosed in an article entitled "The Pattern Extraction Architecture: A Connectionist Alternative to the Von Neumann Architecture" in Biological and Artificial Computation: from Neuroscience and Technology (1997), pp. 634–43, Berlin: Springer, which article is authored by L. Andrew Coward, the inventor of the present invention, and is hereby incorporated by reference in its entirety.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

Having thus described the invention, what is claimed is:

1. A method performing complex combinations of functionality on a system, and for heuristically defining and modifying such functionality, the method comprising:
   a) acquiring data about the system, at each of a plurality of points in time, from each of at least one data domain through which data is available from the system;
   b) identifying combinations of data which recur;
   c) associating a repetition cluster with each combination of data which recurs;
   d) executing an action associated with a corresponding repetition cluster;
   e) acquiring from each of the at least one data domains data corresponding to the consequences of executing each of the actions;
   f) determining from data derived from the consequences of actions associated with corresponding repetition clusters of data which actions are desirable; and
   g) increasing the probability that a desirable action will be executed when a combination of data is acquired which substantially corresponds to a repetition cluster associated wit the desirable action.

2. The method of claim 1 further comprising modulating the relative probability that a particular action will be determined to be desirable.

3. The method of claim 1 further comprising the step of entering the machine into a sleep mode wherein the distribution of information in the system is minimized.

4. The method of claim 1 wherein the system is a telecommunications network.

5. The method of claim 1 wherein the system is a military battlefield.

6. The method of claim 1 wherein the data comprises verbal speech generated by at least one human.

7. The method of claim 1 wherein the data comprises verbal speech generated by at least one human, and the actions comprise transcribing the speech into symbols readable by a computer.

8. The method of claim 1 wherein the data comprises verbal speech generated by at least one human, and the actions comprise transcribing the speech into symbols on printed matter.

9. The method of claim 1 wherein the data comprises verbal speech generated in a first language by at least one human, and the actions comprise translating the speech from the first language into a second language.

10. A machine having a functional architecture configured for performing complex, heuristically defined functions on a system, and which architecture permits the machine to be readily copied, created, and repaired, and the functionary to be readily modified, the machine comprising:
   a) at least one clustering function connected for acquiring data about the system, at each of a plurality of points in time, from each of at least one data domain of the system, the at least one clustering function having an array of first devices arranged in an hierarchical organization of repetition definition and detection clusters within the machine for identifying repetitions of information conditions from the data domains and generating at least one action recommendation from the identified repetitions of information conditions; and
   b) at least one competition function connected to the at least one clustering function for receiving the at least one action recommendation, the at least one competition function having an array of second devices arranged in an hierarchical organization of clusters, which second devices are adapted for associating the at least one action recommendation with system actions, and for selecting a single action recommendation according to predetermined criteria of desirability, the at least one competition function being further connected for transmitting the selected action to the network.

11. The machine of claim 10 further comprising means for entering the machine into a sleep mode to minimize the required distribution of information between devices and clusters in the clustering function.

12. The machine of claim 10 wherein the at least one clustering function further comprises a plurality of superclusters into which the array of first devices are arranged, the superclusters being connected for receiving the data about the system and for generating one of the at least one action recommendations.

13. The machine of claim 10 wherein the at least one clustering function further comprises a plurality of superclusters connected for receiving the data about the system and for generating one of the at least one action recommendations, each which superclusters comprises a plurality of clusters into which the array of first devices are arranged.

14. The machine of claim 10 wherein the at least one competition function further comprises a plurality of channels into which the array of second devices are arranged, each channel being connected for one action recommendation from the at least one cluster function, each of which devices in one channel being connected for stimulating the generation of outputs from the same channel and for inhibiting the generation of outputs from all other channels, until only a single channel produces a action recommendation.

15. The machine of claim 10 wherein each device of the array of first devices and each device of the array of second devices comprises a plurality of input lines connected for receiving one of data or output generated by another device, an output line for sending an output signal, and a memory unit to store a threshold value which must be exceeded by input received on the input lines prior to generating a signal on the output lines.

16. The machine of claim 10 wherein the array of first devices are arranged in layers within clusters within the at least one clustering function, the array of second devices are arranged in layers within clusters within the at least one competition function, and each device of the array of first devices and each device of the array of second devices comprises at least one plurality of input lines connected for receiving one of data or output generated by another device, an output line for sending an output signal, and a memory unit to store a threshold value which must be exceeded by input received on the input lines prior to generating a signal on the output lines.

17. The machine of claim 10 further comprising a structure configured within the clusters for providing and optimizing subfunctions of the cluster function.

18. The machine of claim 10 further comprising at least one device mechanism for enabling the clustering function at all levels.

19. The machine of claim 10 further comprising at least one mechanism to simulate the effects of implementing actions to improve system actions.

20. The machine of claim 10 further comprising at least one functional device which utilizes a clustering function and a competition function to prioritize actions and to provide feedback of consequences of actions.

21. The machine of claim 10 further comprising at least one functional device which utilizes a clustering function and a competition function to manage machine resources.

22. The machine of claim 10 wherein the system is a telecommunications network, and the action recommendations further comprise designing and building telecommunications networks.

23. The machine of claim 10 wherein the action recommendations are strategic maneuvers implemented on a battlefield.

24. The machine of claim 10 wherein the action recommendations are to interpret human speech.

25. The machine of claim 10 wherein the action recommendations are to interpret and slate human speech.

* * * * *

UNITED STATES PATENT AND TRADEMARK OFFICE
CERTIFICATE OF CORRECTION

PATENT NO. : 6,363,420 B1
DATED : March 26, 2002
INVENTOR(S) : Coward

It is certified that error appears in the above-identified patent and that said Letters Patent is hereby corrected as shown below:

Title page,
Item [73], Assignee, delete "Mortel" and insert -- Nortel --

Column 2,
Line 11, delete "13" and insert -- 15 --

Column 4,
Line 10, delete "20"
Line 56, after "devices", insert -- are --

Column 6,
Line 34, delete "me" and insert -- the --

Column 7,
Line 30, delete "m" and insert -- in --

Column 9,
Line 18, delete "he" and insert -- the --
Line 42, delete "927" and insert -- 922 --

Column 11,
Line 40, delete "s1 and s2" and insert -- $\varepsilon_1$ and $\varepsilon_2$ --
Line 55, delete "1039" and insert -- 1038 --

Column 15,
Line 45, delete "wit" and insert -- with --

Column 16,
Line 6, delete "functionary" and insert -- functionality --

UNITED STATES PATENT AND TRADEMARK OFFICE
CERTIFICATE OF CORRECTION

PATENT NO.    : 6,363,420 B1
DATED         : March 26, 2002
INVENTOR(S)   : Coward It is certified that error appears in the above-identified patent and that said Letters Patent is hereby corrected as shown below:

Column 18,
Line 16, delete "slate" and insert -- translate --

Signed and Sealed this

Eighteenth Day of March, 2003

JAMES E. ROGAN
*Director of the United States Patent and Trademark Office*